United States Patent
Tesar

(10) Patent No.: US 9,879,760 B2
(45) Date of Patent: Jan. 30, 2018

(54) ROTARY ACTUATOR WITH SHORTEST FORCE PATH CONFIGURATION

(71) Applicant: Delbert Tesar, Austin, TX (US)

(72) Inventor: Delbert Tesar, Austin, TX (US)

( * ) Notice: Subject to any disclaimer, the term of this patent is extended or adjusted under 35 U.S.C. 154(b) by 870 days.

(21) Appl. No.: 14/195,603

(22) Filed: Mar. 3, 2014

(65) Prior Publication Data

US 2014/0224064 A1 Aug. 14, 2014

Related U.S. Application Data

(60) Continuation-in-part of application No. 13/593,397, filed on Aug. 23, 2012, now abandoned, which is a (Continued)

(51) Int. Cl.
| | |
|---|---|
| *F16H 1/32* | (2006.01) |
| *F16H 1/28* | (2006.01) |
| *H02K 7/116* | (2006.01) |
| *F16H 1/46* | (2006.01) |
| *H02K 19/10* | (2006.01) |

(52) U.S. Cl.
CPC .............. *F16H 1/32* (2013.01); *H02K 7/116* (2013.01); *F16H 1/28* (2013.01); *F16H 1/46* (2013.01);

(Continued)

(58) Field of Classification Search
CPC .................................... F16H 1/28; F16H 1/32

(Continued)

(56) References Cited

U.S. PATENT DOCUMENTS

| 276,776 A | 5/1883 | Clemons |
|---|---|---|
| 341,389 A | 5/1886 | Prescott |

(Continued)

FOREIGN PATENT DOCUMENTS

| DE | 4226133 | 12/1993 |
|---|---|---|
| DE | 19714528 | 9/1997 |

(Continued)

OTHER PUBLICATIONS

Ghionea, Adrian et al., "Utilization of Some Computer Assisted Techniques in Generating and Study of the Hypocycloidal Flanks of the Spur Gear Teeth Stress," 5th International Meeting of the Carpathian Region Specialists in the Field of Gears; Jan. 25, 20014; 8 pages.

Litvin and Tsay, "Helical Gears With Circular Arc Teeth: Generation, Geometry, Precision and Adjustment to Errors, Computer Aided Simulation of Conditions of Meshing, and Bearing Contact," NASA Contractor Report 4089; AVSCOM Technical Report 87-C-18; Oct. 1987; 95 pages.

Sharke, Paul, "The start of a new movement"; Mechanical Engineering, Aug. 2002, 3 pages.

(Continued)

*Primary Examiner* — Ha D Ho
(74) *Attorney, Agent, or Firm* — John A. Fortkort; Fortkort & Houston PC

(57) ABSTRACT

A parallel eccentric electro-mechanical actuator provides motive power and includes an electric prime mover that drives the reducer's pinion gear. This pinion drives minimum three star gears with stationary shaft bearings. Each shaft contains an eccentric which are completely in parallel with each other. These eccentrics can be thought of as parallel/in-phase driven crankshafts. Each eccentric drives the parallel eccentric (PE) gear through a bearing. The PE gear exhibits a circular motion (without rotation) which in itself is unbalanced. The crankshafts have another eccentric which create an opposite inertia force to balance that of the PE gear. The PE gear contains an external toothed gear on its periphery. It meshes with the internal teeth of the output ring gear. The relative motion between the PE gear and the ring gear is that the PE gear rolls inside the ring gear. This relative motion is called hypo-cycloidal motion.

27 Claims, 21 Drawing Sheets

Related U.S. Application Data continuation of application No. 13/236,767, filed on Sep. 20, 2011, now abandoned, which is a division of application No. 12/032,931, filed on Feb. 18, 2008, now Pat. No. 8,033,942, which is a continuation-in-part of application No. 11/288,042, filed on Nov. 28, 2005, now Pat. No. 7,431,676, which is a continuation-in-part of application No. 10/714,183, filed on Nov. 14, 2003, now Pat. No. 7,081,062.

(60) Provisional application No. 60/429,276, filed on Nov. 25, 2002, provisional application No. 60/890,246, filed on Feb. 16, 2007.

(52) U.S. Cl.
CPC .... *F16H 2001/2881* (2013.01); *H02K 19/103* (2013.01); *Y10T 74/2186* (2015.01)

(58) Field of Classification Search
USPC .......................................... 475/168, 176–180
See application file for complete search history.

(56) References Cited

U.S. PATENT DOCUMENTS

| | | |
|---|---|---|
| 386,168 A | 7/1888 | Spencer et al. |
| 474,903 A | 5/1892 | Cottrell |
| 546,249 A | 9/1895 | Regan |
| 908,529 A | 1/1909 | Williama |
| 978,371 A | 12/1910 | Harrison |
| 1,009,954 A | 1/1911 | DeBriones |
| 987,430 A | 3/1911 | Conant |
| 1,192,627 A | 7/1916 | Hatlee |
| 1,217,427 A | 2/1917 | Fast |
| 1,282,172 A | 10/1918 | Beirns |
| 1,313,537 A | 8/1919 | Jones |
| 1,499,763 A | 7/1924 | Davis |
| 1,514,938 A | 11/1924 | Taub |
| 1,590,166 A | 6/1926 | Howard |
| 1,601,750 A | 10/1926 | Wildhaber |
| 1,601,760 A | 10/1926 | Wildhaber |
| 1,641,766 A | 9/1927 | Laukhuff |
| 1,693,154 A | 11/1928 | Newmann |
| 1,694,031 A | 12/1928 | Braren |
| 1,735,662 A | 11/1929 | Trevino |
| 1,767,866 A | 6/1930 | Wildhaber |
| 1,770,035 A | 7/1930 | Heap et al. |
| 1,831,903 A | 11/1931 | Chrisman et al. |
| 1,844,471 A | 2/1932 | Johnson |
| 1,942,795 A | 1/1934 | Benson |
| 2,026,880 A | 1/1936 | Fliesberg et al. |
| 2,037,787 A | 4/1936 | Hughes |
| 2,049,696 A | 8/1936 | Fliesberg |
| 2,084,844 A | 6/1937 | Harris |
| 2,108,384 A | 2/1938 | Moisy |
| 2,168,164 A | 8/1939 | Kittredge |
| 2,170,951 A | 8/1939 | Perry |
| 2,250,259 A | 7/1941 | Foote, Jr. |
| 2,303,365 A | 12/1942 | Karlsen |
| 2,382,482 A | 8/1945 | Henry |
| 2,408,993 A | 10/1946 | Nardone |
| 2,475,504 A | 7/1949 | Jackson |
| 2,481,627 A | 9/1949 | Sharpe |
| 2,482,568 A | 9/1949 | Werner |
| 2,495,811 A | 1/1950 | Hollmann |
| 2,666,336 A | 1/1954 | Gerotors |
| 2,677,288 A | 5/1954 | Gnahrich |
| 2,709,929 A | 7/1955 | Godwin |
| 2,750,850 A | 6/1956 | Wildhaber |
| 2,748,616 A | 7/1956 | Foster et al. |
| 2,837,937 A | 6/1958 | Kraus |
| 2,881,619 A | 4/1959 | Fox et al. |
| 2,922,294 A | 1/1960 | Wildhaber |
| 2,966,078 A | 12/1960 | Wright |
| 2,972,910 A | 2/1961 | Menge |
| 3,011,304 A | 12/1961 | Sundt |
| 3,019,705 A | 2/1962 | Wilkinson |
| 3,028,513 A | 4/1962 | Sundt |
| 3,037,400 A | 6/1962 | Sundt |
| 3,056,315 A | 10/1962 | Mros |
| 3,144,791 A | 8/1964 | Menge, Sr. |
| 3,160,032 A | 12/1964 | Black |
| 3,192,799 A | 7/1965 | Pamplin |
| 3,304,795 A | 2/1967 | Rouverol |
| 3,307,434 A | 3/1967 | Kope |
| 3,310,990 A | 3/1967 | Zettel |
| 3,371,552 A | 3/1968 | Soper |
| 3,402,621 A | 9/1968 | Johnson et al. |
| 3,413,896 A | 12/1968 | Wildhaber |
| 3,424,036 A | 1/1969 | Golgan |
| 3,427,901 A | 2/1969 | Wildhaber |
| 3,429,393 A | 2/1969 | Lorence |
| 3,451,290 A | 6/1969 | Wildhaber |
| 3,454,394 A | 7/1969 | Honobe |
| 3,546,972 A | 12/1970 | Morozumi |
| 3,602,070 A | 8/1971 | Verge et al. |
| 3,705,522 A | 12/1972 | Ogawa |
| 3,709,055 A | 1/1973 | Grove |
| 3,729,276 A | 4/1973 | Boyadjieff et al. |
| 3,766,790 A | 10/1973 | Weir |
| 3,903,750 A | 9/1975 | Takasu |
| 3,907,470 A | 9/1975 | Harle et al. |
| 3,924,478 A | 12/1975 | Takasu |
| 3,975,973 A | 8/1976 | Haase |
| 4,016,780 A | 4/1977 | Baranyi |
| 4,023,441 A | 5/1977 | Osterwalder |
| 4,095,150 A | 6/1978 | Senckel |
| 4,155,276 A | 5/1979 | Fengler |
| 4,243,355 A | 1/1981 | Brudi et al. |
| 4,246,991 A | 1/1981 | Oldakowski |
| 4,270,401 A | 6/1981 | Davidson |
| 4,289,996 A | 9/1981 | Barnes et al. |
| 4,345,191 A | 8/1982 | Takats et al. |
| 4,367,424 A | 1/1983 | Presley |
| 4,407,170 A | 10/1983 | Fukui |
| 4,452,102 A | 6/1984 | Shaffer |
| 4,472,780 A | 9/1984 | Chenoweth et al. |
| 4,505,166 A | 3/1985 | Tesar |
| 4,512,213 A | 4/1985 | Newton |
| 4,563,908 A | 1/1986 | Shube |
| 4,603,594 A | 8/1986 | Grimm |
| 4,604,916 A | 8/1986 | Distin, Jr. |
| 4,614,128 A | 9/1986 | Fickler |
| 4,669,403 A | 6/1987 | Bagnall |
| 4,679,485 A | 7/1987 | Nelson et al. |
| 4,745,815 A | 5/1988 | Klopfenstein |
| 4,768,400 A | 9/1988 | McKay |
| 4,846,018 A | 7/1989 | Matsumoto et al. |
| 4,922,781 A | 5/1990 | Peiji |
| 4,988,581 A | 1/1991 | Wycliffe |
| 5,030,184 A | 7/1991 | Rennerfelt |
| 5,039,900 A | 8/1991 | Nashiki et al. |
| 5,102,377 A | 4/1992 | Spanski |
| 5,116,291 A | 5/1992 | Toyosumi et al. |
| 5,136,201 A | 8/1992 | Culp |
| 5,144,851 A | 9/1992 | Grimm et al. |
| 5,214,972 A | 6/1993 | Larson et al. |
| 5,232,412 A | 8/1993 | Zheng et al. |
| 5,277,672 A | 1/1994 | Droulon et al. |
| 5,293,107 A | 3/1994 | Akeel |
| 5,295,925 A | 3/1994 | Hirabayashi |
| 5,313,852 A | 5/1994 | Arena |
| 5,324,240 A | 6/1994 | Gittinger |
| 5,355,743 A | 10/1994 | Tesar |
| 5,505,668 A | 4/1996 | Koriakov-Savoyski |
| 5,571,975 A | 11/1996 | Smith |
| 5,633,554 A | 5/1997 | Kaji |
| 5,685,694 A | 11/1997 | Jones et al. |
| 5,689,994 A | 11/1997 | Nagai et al. |
| 5,692,412 A | 12/1997 | Rosheim |
| 5,692,989 A | 12/1997 | Kamlukin |
| 5,695,425 A | 12/1997 | Hashimoto et al. |
| 5,704,864 A | 1/1998 | Yanagisawa |
| 5,809,837 A | 9/1998 | Shaffer |
| 5,910,066 A | 6/1999 | Schulz et al. |

(56) References Cited

U.S. PATENT DOCUMENTS

| | | | |
|---|---|---|---|
| 5,957,798 A | 9/1999 | Smith, III et al. | |
| 5,957,803 A | 9/1999 | Fini, Jr. | |
| 5,957,804 A | 9/1999 | Schulz et al. | |
| 5,964,154 A | 10/1999 | Michalik | |
| 5,990,587 A | 11/1999 | Shimanovich et al. | |
| 6,034,466 A | 3/2000 | Blanding et al. | |
| 6,098,479 A | 8/2000 | Hoermansdoerfer | |
| 6,102,827 A | 8/2000 | Teasdale et al. | |
| 6,107,726 A | 8/2000 | Near et al. | |
| 6,119,542 A | 9/2000 | Arbrink | |
| 6,123,640 A | 9/2000 | Schulz | |
| 6,158,295 A | 12/2000 | Nielsen | |
| 6,184,608 B1 | 2/2001 | Carbuz et al. | |
| 6,192,321 B1 | 2/2001 | Grumstrup et al. | |
| 6,220,984 B1 | 4/2001 | Schulz et al. | |
| 6,244,843 B1 | 6/2001 | Kosuge | |
| 6,269,702 B1 | 8/2001 | Lambson | |
| 6,294,859 B1 | 9/2001 | Jaenker | |
| 6,307,301 B1 | 10/2001 | Ngo et al. | |
| 6,313,568 B1 | 11/2001 | Sullivan et al. | |
| 6,327,927 B1 | 12/2001 | Rogg et al. | |
| 6,336,887 B1 | 1/2002 | Willmot | |
| 6,367,571 B1 | 4/2002 | Schwarz | |
| 6,377,011 B1 | 4/2002 | Ben-Ur | |
| 6,440,030 B1 | 8/2002 | Minegishi et al. | |
| 6,450,913 B1 | 9/2002 | Strowik et al. | |
| 6,672,966 B2 | 1/2004 | Muju et al. | |
| 6,679,801 B2 | 1/2004 | Nohara et al. | |
| 6,743,137 B2 | 6/2004 | Rilbe | |
| 6,791,215 B2 | 9/2004 | Tesar | |
| 6,948,402 B1 | 9/2005 | Amendolea | |
| 6,948,409 B2 | 9/2005 | Amendolea | |
| 6,991,580 B2 | 1/2006 | Elser et al. | |
| 7,081,062 B2 | 7/2006 | Tesar | |
| 7,122,926 B2 | 10/2006 | Tesar | |
| 7,201,700 B2 | 4/2007 | Buxton | |
| 7,374,525 B2 | 5/2008 | Massaro | |
| 7,431,676 B2 | 10/2008 | Tesar | |
| 7,534,184 B2 * | 5/2009 | Tsurumi | F16H 1/32 475/162 |
| 7,552,664 B2 | 6/2009 | Bulatowicz | |
| 7,553,249 B2 * | 6/2009 | Nohara | F16C 3/08 475/162 |
| 7,604,559 B2 * | 10/2009 | Fujimoto | F16H 1/32 475/170 |
| 7,604,599 B2 | 10/2009 | Fujimoto et al. | |
| 7,641,579 B2 * | 1/2010 | Junkers | F16H 1/32 475/178 |
| 7,722,494 B2 | 5/2010 | Tesar | |
| 7,766,634 B2 | 8/2010 | Liavas et al. | |
| 7,811,193 B2 | 10/2010 | Nakamura | |
| 7,935,017 B2 | 5/2011 | Kurita et al. | |
| 7,942,779 B2 | 5/2011 | Kobayashi | |
| 7,976,420 B2 | 7/2011 | Nakamura | |
| 7,988,581 B2 | 8/2011 | Kobayashi | |
| 8,022,564 B2 | 9/2011 | Nohara et al. | |
| 8,029,400 B2 | 10/2011 | Nakamura | |
| 8,033,942 B2 | 10/2011 | Tesar | |
| 8,047,943 B2 | 11/2011 | Nakamura | |
| 8,117,945 B2 | 2/2012 | Nakamura | |
| 8,162,789 B2 | 4/2012 | Takeuchi | |
| 8,196,492 B1 | 6/2012 | Denu | |
| 8,209,052 B2 | 6/2012 | Lauria et al. | |
| 8,235,856 B2 | 8/2012 | Nakamura | |
| 8,308,599 B2 | 11/2012 | Akami | |
| 8,323,140 B2 | 12/2012 | Nakamura | |
| 8,353,798 B2 | 1/2013 | Miyoshi et al. | |
| 8,382,629 B2 | 2/2013 | Hirata | |
| 8,435,149 B2 | 5/2013 | Koyama et al. | |
| 8,523,732 B2 | 9/2013 | Le Moal | |
| 8,545,357 B2 | 10/2013 | Hibino | |
| 2001/0012809 A1 * | 8/2001 | Fujimoto | F16H 1/32 475/162 |
| 2003/0027681 A1 | 2/2003 | Kakemo | |
| 2003/0145667 A1 | 8/2003 | Donald et al. | |
| 2003/0184171 A1 | 10/2003 | Teraoka et al. | |
| 2004/0007923 A1 | 1/2004 | Tesar | |
| 2004/0102274 A1 | 5/2004 | Tesar | |
| 2004/0103742 A1 | 6/2004 | Tesar | |
| 2005/0168084 A1 | 8/2005 | Tesar | |
| 2005/0221945 A1 | 10/2005 | Plath | |
| 2006/0264292 A1 | 11/2006 | Plath | |
| 2007/0012135 A1 | 1/2007 | Tierney et al. | |
| 2007/0168081 A1 | 7/2007 | Shin et al. | |
| 2007/0249457 A1 | 10/2007 | Tesar | |
| 2008/0060473 A1 | 3/2008 | Li | |
| 2008/0070736 A1 | 3/2008 | Yoshino et al. | |
| 2008/0139357 A1 | 6/2008 | Fujimoto | |
| 2008/0257088 A1 | 10/2008 | Tesar | |
| 2008/0269922 A1 | 10/2008 | Tesar | |
| 2008/0295623 A1 | 12/2008 | Kurita et al. | |
| 2009/0075771 A1 | 3/2009 | Tesar | |
| 2009/0118050 A1 | 5/2009 | Takeuchi | |
| 2010/0113206 A1 | 5/2010 | Wang et al. | |
| 2012/0088622 A1 | 4/2012 | Tesar | |
| 2012/0204671 A1 | 8/2012 | Tesar | |
| 2012/0215450 A1 | 8/2012 | Ashok et al. | |
| 2013/0217530 A1 | 8/2013 | Tesar | |
| 2014/0224064 A1 | 8/2014 | Tesar | |
| 2014/0228162 A1 | 8/2014 | Tesar | |
| 2014/0246893 A1 | 9/2014 | Tesar | |

FOREIGN PATENT DOCUMENTS

| | | |
|---|---|---|
| EP | 0058025 | 1/1982 |
| EP | 0058025 A1 | 8/1982 |
| EP | 0527483 | 8/1992 |
| EP | 0527483 A2 | 2/1993 |
| EP | 2149724 | 5/2008 |
| EP | 2169263 | 5/2008 |
| EP | 2149724 A1 | 2/2010 |
| EP | 2169263 B1 | 3/2010 |
| GB | 008203 | 0/1903 |
| GB | 0224449 | 3/1924 |
| GB | 224449 | 11/1924 |
| GB | 0419171 | 12/1933 |
| GB | 419171 | 11/1934 |
| GB | 0450246 | 12/1934 |
| GB | 0426136 | 3/1935 |
| GB | 426136 | 3/1935 |
| GB | 450246 | 7/1936 |
| GB | 0676894 | 11/1949 |
| GB | 676894 | 8/1952 |
| GB | 0759185 | 1/1954 |
| GB | 0775629 | 8/1955 |
| GB | 759185 | 10/1956 |
| GB | 775629 | 5/1957 |
| GB | 0856486 | 7/1957 |
| GB | 0926760 | 10/1959 |
| GB | 856486 | 12/1960 |
| GB | 926760 | 5/1963 |
| GB | 1083689 | 8/1965 |
| GB | 1104250 | 3/1966 |
| GB | 1179105 | 5/1966 |
| GB | 1176936 | 9/1966 |
| GB | 1083689 | 9/1967 |
| GB | 1104250 | 2/1968 |
| GB | 1176936 | 1/1970 |
| GB | 1179105 | 1/1970 |
| GB | 1378909 | 3/1972 |
| GB | 1494895 | 12/1973 |
| GB | 1453135 | 1/1974 |
| GB | 1409651 | 2/1974 |
| GB | 1409651 | 10/1975 |
| GB | 1453135 | 10/1976 |
| GB | 1453135 A | 10/1976 |
| GB | 1494895 | 12/1977 |
| GB | 2014260 | 3/1979 |
| GB | 2014260 A | 8/1979 |
| GB | 2271025 | 3/1994 |
| GB | 2271025 A | 3/1994 |
| GB | 2377740 | 7/2001 |
| GB | 2387882 | 2/2002 |

(56) References Cited

FOREIGN PATENT DOCUMENTS

| GB | 2377740 | A | 1/2003 |
|---|---|---|---|
| GB | 2387882 | A | 10/2003 |
| GB | 2489503 | | 3/2011 |
| GB | 2489503 | A | 10/2012 |
| WO | 96/04493 | | 2/1996 |
| WO | 96/04493 | A1 | 2/1996 |

OTHER PUBLICATIONS

Darali Cycloidal Reducers, ISO-9002, Cycloidal Advantage; 2000; 11 pages.

The "Quadrant Drive" Speed Reducer Drive System; info@plumettaz.ch; Jun. 2002; 4 pages.

Traction electric motor (generator) in an epicyclic configuration; My yet2.com-TechPak; www.yet2.com; Aug. 2002; 6 pages.

Mectrol Products Information: Reducers, Features and Benefits; www.mectrol.com/products/Reducers/Doien/Features.htm; Jun. 17, 2002; 4 pages.

Ghionea, Adrian et al.; "Utilization of Some Computer Assisted Techniques in Generating and Study of The Hypocycloidal Flanks of The Spur Gear Teeth Stress"; 5th International Meeting of the Carpathian Region Specialists in The Field of Gears; May 2004; 8 pages.

Rabindran, Dinesh et al.; "A Differential-Based Dual Actuator for a Safe Robot Joint: Theory and Experiments"; World Automated Congress (WAC); Aug. 2014; 6 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Litvin, Faydor L. et al.; "Helical Gears With Circular Arc Teeth: Generation, Geometry, Precision and Adjustment to Errors, Computer Aided Simulation of Conditions of Meshing, and Bearing Contact"; NASA Contractor Report 4089; AVSCOM Technical Report 87-C-18; Oct. 1987; 95 pages.

Krishnamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.

Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.

Koran, Lucas et al.; "Duty Cycle Analysis to Drive Intelligent Actuator Development"; IEEE Systems Journal; May 2008; 14 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011; 16 pages.

Hvass, Paul Brian et al.; "Condition Based Maintenance for Intelligent Electromechanical Actuators"; Research Paper; Jun. 2004; 262 pages.

Kang, Seong-Ho et al.; "Indoor GPS Metrology System with 3D Probe for Precision Applications"; ASPE.pointinspace.com/publications/annual_2004 Papers; 2004; 4 pages.

Knight, W.; "The Robots Running This Way"; MIT Technology Review; 2014; 8 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

\* cited by examiner

ROTARY ACTUATOR WITH SHORTEST FORCE PATH CONFIGURATION

RELATED APPLICATIONS

This application is a continuation-in-part application of U.S. patent application Ser. No. 13/593,397, filed Aug. 23, 2012, now pending, having the same title and the same inventor, and which is incorporated herein by reference in its entirety; which application is a continuation application of U.S. patent application Ser. No. 13/236,767, filed Sep. 20, 2011, now abandoned, and which is incorporated herein by reference in its entirety; which application is a divisional application of U.S. patent application Ser. No. 12/032,931, filed Feb. 18, 2008, now U.S. Pat. No. 8,033,942, issued Oct. 11, 2011, and which is incorporated herein by reference in its entirety; which application is a continuation-in-part application of U.S. patent application Ser. No. 11/288,042, filed Nov. 28, 2005, now U.S. Pat. No. 7,431,676, issued Oct. 7, 2008, and which is incorporated herein by reference in its entirety; which application is a continuation-in-part application of U.S. patent application Ser. No. 10/714,183, filed Nov. 14, 2003, now U.S. Pat. No. 7,081,062, issued Jul. 25, 2006, and which is incorporated herein by reference in its entirety; which application claims the benefit of U.S. provisional application No. 60/429,276, filed Nov. 25, 2002, and which is incorporated herein by reference in its entirety; and the benefit of U.S. Provisional application No. 60/890,246, filed Feb. 16, 2007, which is incorporated herein by reference in its entirety.

FIELD OF THE DISCLOSURE

The present disclosure relates generally to mechanical actuators, and more particularly to rotary actuators having a shortest force path configuration.

DESCRIPTION OF THE RELATED ART

Currently the design of mechanical systems using actuators is a complex task with many options to choose from, each option with inherent flaws and shortcomings. The narrow reduction range of these options prevents the system from being versatile, which may be expensive and wasteful. Customizing the system to such small ranges creates specialized equipment. Specialized equipment is expensive to build, maintain, and operate.

At this time there is no proven ideal reducer between 25-to-1 and 75-to-1. From 25:45-to-1, the two stage star compound does very well. From 35-75-to-1, the differencing epicyclic with three or more planets does quite well. However, if an application requires reduction over the whole range, multiple units are going to be needed.

Two parallel 4-bar linkages (equal parallel cranks) when hooked together (90° from each other at the cranks) provide pure circular motion (the radius of the cranks) for all points in the connecting rod even though the connecting rod itself does not rotate. Should these cranks become very small, they can be physically embodied as eccentrics. This could properly be called parallel eccentric motion which will be the basis for the gear reducer developed here. Note that two cranks at 180° are indeterminate in the central position for a single input driver. Usually, it is best to use three or more such cranks (eccentrics) driven simultaneously through a star compound gear arrangement to provide the smoothest continuous motion.

Currently the best practice commercial electro-mechanical actuator is the Nabtesco gear train. Note that the Nabtesco uses cycloidal motion with cycloidal wave teeth. The Nabtesco suffers from too high a load carrying demand on its crankshaft bearings, long force path, a high pressure angle, significantly higher inherent mesh sliding friction, and a damaging (and unfixable) lost motion.

Developing a simple high load capacity electro-mechanical actuator to best meet a larger reduction range will solve many of these problems. The unit should engage the maximum number of teeth in the mesh, exhibit the least lost motion, and contain a nominal level of effective inertia.

SUMMARY

As discussed above, there is a diverse environment of electro-mechanical actuators capable of specific reduction ratios. The inventor of the parallel eccentric electro-mechanical actuator described herein believes that the effectiveness of a single actuator that covers a larger part of the reduction range would drastically improve the designs and versatility of the larger systems. As well, it is believed that more robust and cost effective designs can be produced with an actuator capable of spanning the larger reduction range.

According to one aspect of the present disclosure, the disclosed parallel eccentric electro-mechanical actuator provides motive power and includes an electric prime mover that drives the pinion gear of the reducer. This pinion drives three (or more) star gears with stationary shaft bearings. Each shaft contains an eccentric e (all the same size) which are completely in parallel with each other (in phase). These eccentrics can be thought of as three parallel/in-phase driven crankshafts. Each eccentric drives the parallel eccentric (PE) gear through a bearing. The PE gear exhibits a circular motion (without rotation) which in itself is unbalanced. To counteract this imbalance, the crankshafts have another eccentric with magnitude k×e which drives a PE balance mass. This PE mass must create an opposite inertia force to balance that of the PE gear (which includes the other unbalanced masses associated with the eccentrics and crankshaft bearings). Hence, the weight of the PE mass can be reduced according to the magnitude of the eccentric ratio k. The PE gear contains an external toothed gear on its periphery. It meshes with the internal teeth of the output ring gear. The relative motion between the PE gear and the ring gear is that the PE gear rolls inside the ring gear. This relative motion is called hypo-cycloidal motion.

According to another aspect of the disclosure, a rotary actuator is disclosed whose construction is based on shortest force path principles. In a preferred embodiment, the rotary actuator comprises an output attachment plate, an outer attachment shell and a principal bearing, and the principal bearing has a first surface which is attached to the output attachment plate, and a second surface which is attached to the outer attachment shell. In an especially preferred embodiment, the output attachment plate, outer attachment shell and a principal bearing are arranged such that a line, cylinder or annulus exists which passes through the output attachment plate, the principal bearing and the outer attachment shell.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features, and advantages here provided will become apparent to one with skill in the art upon examination of the following FIGUREs and detailed description. It is intended that all such additional systems, methods feature, and advantages be included within this description, be within the scope of the accompanying claims.

BRIEF DESCRIPTION OF THE DRAWINGS

For a more complete understanding of the features and advantages of the present disclosure, reference is now made to the detailed description of the disclosure along with the accompanying figures in which corresponding numerals in the different figures refer to corresponding parts and in which.

DETAILED DESCRIPTION

Figure 1:
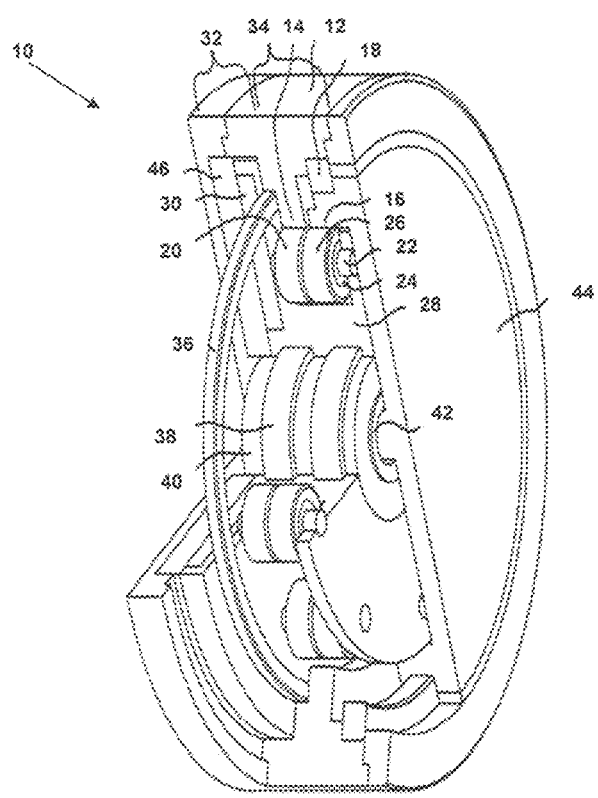
FIG. 1 is a cutaway isometric view of a rotary actuator in accordance with one embodiment of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative of specific ways to make and use the disclosure and do not delimit the scope of the disclosure.

Certain embodiments of the present disclosure are standardized rotary actuators which can be mass produced at low cost and still maintain a high level of performance. Various levels of ruggedness—for example, light, medium, and heavy—may be employed for various applications. In fact, certain of the actuator concepts described herein will be found sufficiently rugged in their basic design that parts made of plastic or formed metal can be used to reduce cost while still providing a highly-versatile actuator useful in a variety of applications. These applications may include, but are not limited to, portable tools, educational robots, toys, and automobiles.

The present disclosure is a new high-performance rotary actuator in a variety of embodiments sharing certain characteristic features. Depending on the application, each of the embodiments incorporates features generating one or more of certain advantages.

The novel design of certain embodiments of the present disclosure provide simplicity of design using a relatively small number of parts and a minimized list of parameters, thereby allowing for a relatively small form factor exhibiting exceptional compactness, stiffness and load capacity, along with quiet and efficient operation. They are designed for easy assembly, ideal for mass production at various quality levels.

In general, these actuators are of exceptionally rugged design, exhibiting relative insensitivity to temperature and tolerance effects. The actuators of the present disclosure incorporate a relatively short force path across a high-stiffness cross-roller bearing, thereby maximizing stiffness and strength. In certain embodiments, the actuators of the present disclosure incorporate standardized attachment architectures.

In order to promote standardization, the rotary actuator of the present disclosure can be configured to serve as a standardized "building block" within a system. Such a building block may, for example, be intelligent and adaptable, provide for a maximum performance envelope, be compact and rugged, be optimized in its structural design, provide standardized interfaces for quick replacement by technicians anywhere in the world, and be produced in large enough quantities to take advantage of economies of scale in manufacturing.

Prime mover requirements may be met either by D.C. brushless motors or switched reluctance motors, either in cylindrical or pancake format. The gear trains may be made unique, compact, rugged and cost effective under production in large quantities.

In certain embodiments, cross-roller bearings are used to form the joint bearings themselves. Cross-roller bearings are selected not only for their stiffness but also owing to their proper geometric configuration. In certain embodiments, the cross-roller bearing or similar large diameter bearing acts as the principal gear train bearing at the same time. Precision large and small-scale actuators can be used separately or combined to satisfy demanding positional accuracy requirements.

In manufacturing cells, the rotary actuator modules of the present disclosure may be used directly as simple transfer devices, drivers of conveyers, or joint actuators in 2 degree-of-freedom manipulators. At the other end of the complexity continuum, highly dexterous manipulators having 10 degrees of freedom and above can be assembled on demand. Each of the above systems could be assembled as needed, all with the same interfaces, and all with the same maintenance requirements, perhaps from only 5 basic sizes in each cell application, and all driven by one universal software package to reduce cost, increase performance, and to open up the architecture of such systems.

FIG. 1 depicts an isometric cutaway view of a rotary actuator 10 in accordance with one embodiment of the present disclosure. Rotary actuator 10 shown in FIG. 1 may be configured to be very rugged, having high levels of both stiffness and shock resistance.

A rotary actuator such as rotary actuator 10 can have a number of geometrical configurations. In one such configuration, a rotary actuator has a "pancake" geometry, being relatively narrow in thickness along its centerline and relatively large in diameter. Rotary actuator 10 shown in FIG. 1 has such geometry. In alternate embodiments, a rotary actuator may have a "coffee can" geometry, being relatively wide along the centerline and relatively small in diameter. Rotary actuator 50 shown in FIG. 2 has this type of geometry.

Generally, the pancake version is driven by a switched reluctance motor (SRM) and optimized to produce higher torques at lower speeds. The "coffee can" version is generally optimized for use in slim/dexterous machines such as serial robot manipulators. This version is usually driven by a brushless D.C. motor of somewhat lower torque and higher speed ranges as compared to the SRM.

In general, it is desirable to satisfy as many design objectives as possible while at the same time minimizing complexity. This combination of design criteria argue in favor of combining functions when possible. In certain embodiments, the rotary actuator of the present disclosure is constructed so as to not merely provide rotary power to a joint, but to function as the joint itself, incorporating sufficient structural rigidity as to make additional rotary bearing structure extraneous.

In certain embodiments, the incorporation of quick-change interfaces into the input/output attachment structures of the rotary actuators provides the designer with the ability to assemble machines on demand. The geometry of one embodiment of such a quick-change interface is described in detail in connection with FIG. 8, below. In certain embodiments, the self-contained actuator may incorporate 80% or more of the machine's complexity, including electronics, brakes, buses, sensors, bearings, motor, gear train, and all necessary attachments and interfaces.

Rotary actuator 10 makes use of internal bull gear 14 and sun gear 16 as part of the attachment components of the rotary actuator 10, separated by a principal cross-roller bearing 18. The bull gear 14 and sun gear 16 are driven by planet gears 20 and 22 supported by bearings 24 on press fit shafts 26 passing through the sides of the planet cage 28.

Because the bull gear 14 and sun gear 16 are part of the structure of the rotary actuator 10, the required weight goes down while the stiffness goes up. Also, because this design employs a large diameter cross-roller bearing 18, the structural stiffness of the rotary actuator 10 is also greatly improved. In certain embodiments, the bearing races can be machined directly into the bull gear 14 and/or sun gear 16 so as to improve the structural integrity of the design. A ball bearing may be used in place of cross-roller bearing 18 in less-demanding applications. Accordingly, the structure of the rotary actuator 10 can be made much smaller, lighter in weight, and more cost effective, through a reduction in the number of parts and simplified assembly. The planet gears 20 and 22 may be used in a Ferguson paradox gear train mechanism to further improve manufacturing simplicity.

Magnet disk 30 of the prime mover 32 is rigidly attached to the planet cage 28 to form the simplest possible configuration between the prime mover 32 and the gear train 34. Planet cage 28 and magnet disk 30 are supported by bearing 36 in the bull gear 14 and needle bearings 38 on stationary shaft 40. This design provides a very rugged support for the moving structure of rotary actuator 10 so as to best resist shock.

Planet cage 28 can be made lighter in order to reduce inertia in cases where additional responsiveness is desirable. The number of planets 20 and 22 may be as small as 2 or as large as 9 depending on the relative dimensions, speed, desired stiffness, inertia requirement, tooth sizing required for loading, and other factors.

Bearing 42 on shaft 40 is used to provide additional support to the output attachment plate 44 of rotary actuator 10. Where stiffness is an important consideration, the attachments to the neighboring structures on shell 12 and plate 44 may be placed in close proximity to cross-roller bearing 18 in order to maximize the resulting structural stiffness of the system. In rotary actuator 10, field 46 is larger than magnet disk 30. This additional size accommodates end turns in the field 46.

The switched reluctance motor (SRM) geometry shown in FIG. 1 is designed to maximize torque, and this design may be optimized for applications wherein high rotational speed is not a principal concern. A wide variety of aspect ratio considerations may be met employing both the SRM and DC prime movers. Given a cylindrical prime mover such as a D.C. brushless motor of higher relative speed and lower relative torque as compared to the switched reluctance motor, the geometry of rotary actuator 10 can be modified into a coffee can geometry having all the other attributes of the pancake-shaped rotary actuator 10. Such an actuator is shown in FIG. 2 and generally designated 50.

In one embodiment, rotary actuator 50 may operate at speeds as much as ten times higher, but produce ten times less torque, than rotary actuator 10 of FIG. 1. In rotary actuator 50, there is a much higher concern for inertia in the moving structure and less concern for stress in the gear teeth due to a lower expected torque capacity.

Figure 2:
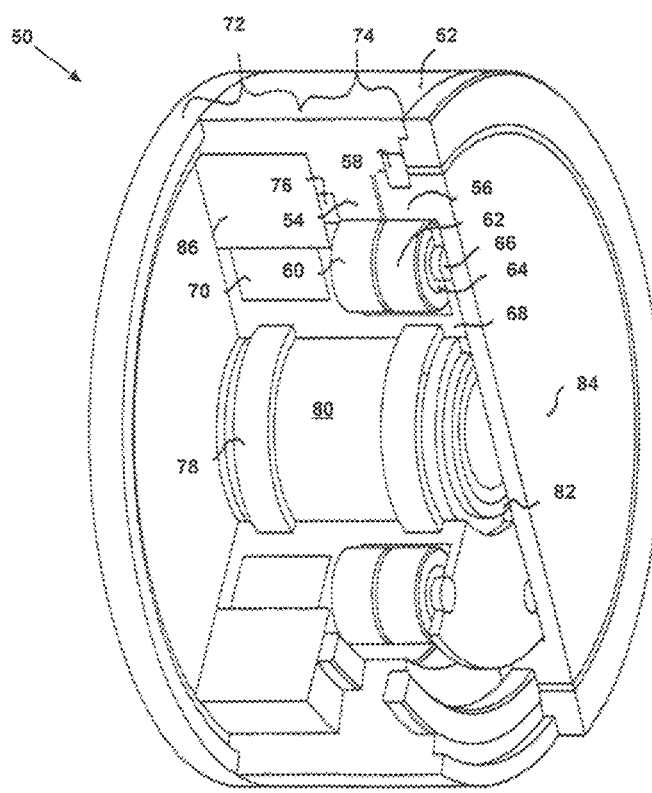
FIG. 2 is a cutaway isometric view of a rotary actuator in accordance with a second embodiment of the present disclosure.

FIG. 2 depicts rotary actuator 50 in an isometric cutaway view in accordance with a second embodiment of the present disclosure. Rotary actuator 50 is typically longer than rotary actuator 10, and there is more concern for the stiffness of the planet cage 68. Accordingly, additional support is provided by bearing 76, embedded in the stiff attachment shell 52 of actuator 50. In order to simplify the design of rotary actuator 50, the planets 60 and 62 are supported by bearings 64 which ride on shafts 66, which are press fit into the planet cage 68 to further increase the stiffness of planet cage 68.

The output attachment plate 84 and central stationary shaft 230 are mutually supported by bearing 82. Generally, because of higher velocities in the D.C. motor, the structure of the planet cage 68 will be lightened to reduce inertia and the bearings 58, 64, and 76 will be chosen for this higher velocity regime.

As will be appreciated by those of skill in the art, additional planets tend to increase stiffness, reduce backlash, and improve positional accuracy at the expense of complexity and increased inertia. Large gear train ratios require the use of multiple stages or Ferguson Paradox type epicyclic gear trains. Generally, the planet gear cage will represent the most complex part of the rotary actuator, adding to cost, complexity, and assembly issues.

In alternate embodiments, compound gears can be used in certain cases. Such gear trains incorporate, however, inherent limitations. These types of gear trains can give a realistic reduction of no greater than 10-to-1. Further, these gear trains tend to exhibit considerable backlash and have high rotary inertia. Finally, they are insufficiently rigid in rotary compliance, are heavy and are not space efficient.

These significant limitations may be substantially reduced or eliminated by arranging multiples of a second gear of a compound gear train in a symmetric array about a first gear for forming a "star compound" gear train. The star compound gear train provides multiple meshes with the input pinion (the first gear), results in no unbalanced forces on the pinion, provides for four to six teeth in mesh, reduces contact and bending stresses, and provides for a compact concentric configuration to match the concentric geometry of the prime mover.

Accordingly, epicyclic gear trains are better for rotary actuators because of their compatible geometry to the rotary prime mover. Unfortunately, these gear trains exhibit limitations as well. The maximum realistic gear reduction of such a mechanism is on the order of 100:1. Compound epicycle gear trains can, of course, provide reductions higher than 100:1 through the use of multiple stages. Compound gear trains, however, incorporate the limitations described above. In general, epicyclic gear trains exhibit a significant degree of backlash, require high tolerances, and are temperature sensitive. In fact, backlash generally must be designed in to account for temperature-related dimensional changes. Finally, the involute gear teeth used in epicyclic gear trains are often designed to be relatively tall, in order to maintain between one to two teeth in mesh. This geometry increases the loading at the root as well as sliding velocity, reducing both the strength and the efficiency of the mechanism.

In order to overcome the above limitations of epicyclic gear trains, elements are described below employing a single planet driven by an eccentric to make a "wobble" plate design while satisfying all the kinematic requirements normally associated with epicyclic gear trains.

One object of the present disclosure is to make the standardized electro-mechanical actuator a simple continuum of design choices among switched reluctance or brushless D.C. motors and star compound, multi-planet or eccentric single planet hypocyclic gear trains. Ideally, each choice can be considered as a plug-in substitute for the other with no other primary design changes.

Accordingly, certain embodiments of the present disclosure may incorporate a single eccentric planet gear train in place of the multi-planet gear train used in FIGS. 1 and 2. The eccentric hypocyclic gear train incorporates a number of advantages, as described below.

In many embodiments, the actuators of the present disclosure incorporate a hypocyclic gear train, which may have a gear reduction ratio as high as 5000:1. These hypocyclic gear train assemblies may incorporate relatively short circular arc gear teeth, with up to 5 or more teeth in contact at a time.

The unique design characteristics of the hypocyclic gear trains provide reduced contact stresses by down to one tenth of known stresses, reduced bending stresses by down to one fifth of known stresses, lower sliding velocity by down to one fifth of known velocities, reduced energy loss, and the potential for preloading the mesh as the tooth comes into its central position.

Each gear tooth can be profiled to be slightly preloaded as it comes into its central position, in order to reduce the generation of lower-order harmonics and control backlash and lost motion. This preloading can be accomplished through the introduction of a slight interference between that tooth and the mating teeth as that tooth comes into its central position. In certain embodiments, a cavity may be introduced within each tooth in order to tailor the stiffness of the teeth and reduce closing noise. In one embodiment, for example, a portion of the required compliance may derive from a partially compliant bearing between the driving eccentric and the wobble gear.

Circular arc tooth profile gear trains exhibit a reduced degree of wear and noise, smooth and gradual load transfer among the teeth, and a reduced or eliminated necessity for critical tolerances, as circular arc teeth do not require the critical tolerances generally associated with involute teeth. A circular arc tooth profile can also exhibit increased strength, as clearances for external involute teeth are not required. Finally, in certain embodiments, a reduction in the sliding velocity between the mating gear teeth reduces the frictional losses within the mechanism.

Figure 3:
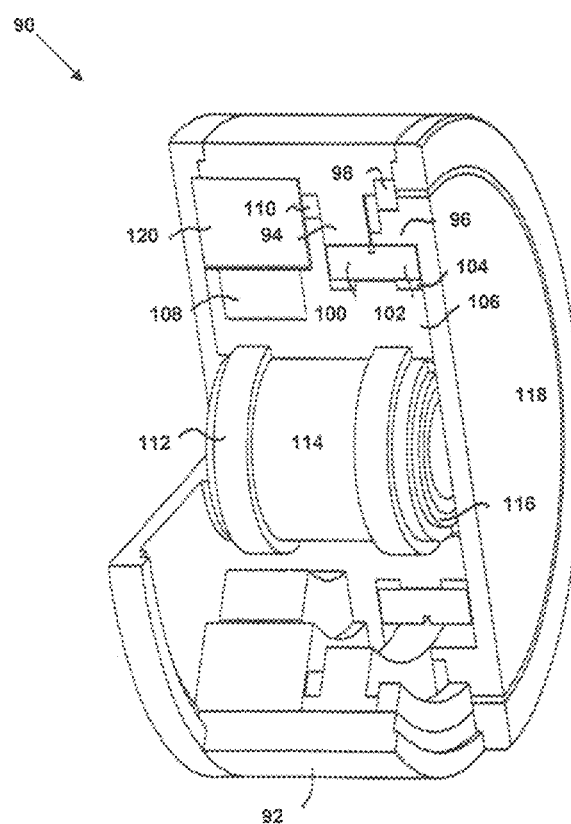
FIG. 3 is a cutaway isometric view of a rotary actuator in accordance with a third embodiment of the present disclosure.

FIG. 3 depicts a cutaway isometric of a rotary actuator 90 incorporating an eccentric hypocyclic gear train. Rotary actuator 90 incorporates a central stationary shaft 110 holding support bearings 112 that support the rotating motor armature 108 that drives the eccentric 106. Support bearings 104 on the eccentric 106 drive the wobble cylinder, which contains the planetary gears 100 and 102 that mesh with the bull gear 94 and sun gear 96 separated by the principal cross-roller bearing or similar large diameter bearing 98.

Bull gear 94 is attached directly to the actuator shell 92 of rotary actuator 90 while sun gear 96 is attached directly to the output attachment plate 118. The motor armature 116 is also held stationary by the actuator shell 92. End plate screws (not shown) assist in making the assembly rather direct, holding the stationary shaft 114 for support bearings 112.

Bearing 112 in the output attachment plate 118 supports the end of the stationary shaft 114. Seal 120 separates the output attachment plate 118 from the shell 302 and protects the cross-roller bearing 98 from the elements. This design incorporates an additional bearing 110 to support the motion and force variation on the eccentric 106.

Rotary actuator 90 is notable for its inherent simplicity. The motor field 116 and rotating motor armature 108, eccentric 106, planetary gears 100 and 102, bull and sun gears 94 and 96, respectively, and the principal roller bearing 98 are the primary components of rotary actuator 90. Secondary components include bearings 116, 118, and 112. The remaining components are stationary, machined components.

Even though rotary actuator 300 is able to provide very high power density in a very small package, it can be adapted to a wide range of application requirements by means of minor design changes, such as numbers of gear teeth, motor winding characteristics and current and voltage levels, as examples. The inherent simplicity and versatility of rotary actuator 90 enables mass production of most of the subcomponents, thereby providing economies of scale and attendant cost reductions. The characteristics of a particular embodiment of rotary actuator 90 may be scaled to one of a number of pre-selected standardized sizes, in order to provide an "off-the-shelf" solution to the system designer. In one example of a standardized set of such actuators, sixteen separate standardized scaled actuators can be provided to meet a wide range of design applications. A set of actuators of the type shown in FIG. 3 may be constructed according to standard sizes. As one example, a set of seventeen actuator sizes spanning from 0.25" diameter up to 90" in diameter could support the construction of a large population of machines, rapidly assembled and made operational as needed.

Simplicity not only brings with it lower cost, it also results in components that are forgiving in their design, manufacture and operation. In particular, rotary actuator 90 should be relatively insensitive to rather large variations in temperature.

The use of a hypocyclic gear train wherein up to approximately five or more gear teeth can be in contact at a given time brings with it the ability to carry very heavy loads, eliminate backlash, minimize lost motion and resist high levels of shock with relatively modest levels of gear tooth stress, thereby providing both high endurance and reduced wear.

The number of design parameters is rather low. They are, to a great extent, independent choices, and each has clear and explicit meaning to the designer. Hence, not only is rotary actuator 90 exceptional in performance in terms of weight, volume, endurance, output inertia, and power density, it is easily understood by most designers, helping to assure its acceptance in the design community.

As described above, the eccentric offset e within the hypocyclic gear train is driven by an electric prime mover and supported by a bearing on a stationary shaft. Given $N_1$, $N_2$ to be the gear tooth numbers for the bull and sun gears, respectively, and $N_1^1$, $N_2^1$ those associated meshing gears on the wobble planet, then the total gear train ratio is given simply by $r=(N_1^1 N_2)/(N_1^1 N_2 - N_1 N_2^1)$. Note that the larger is the eccentric the greater must be the balancing mass for the wobble gear and, therefore, the overall weight of the actuator rises accordingly.

The ratio can range from 10-to-1 up to 5000-to-1, the higher ratios depending on the choice of gear tooth geometry that can be designed for high load capacity, low noise, high precision, or low cost depending on the application. In certain embodiments, the appropriate ratio can be attained using meshing gears wherein the number of teeth between the two varies by a single tooth. Note also that that the pressure angle may be reduced to at least 7 degrees, thereby reducing sliding velocity and internal forces.

In connection with the hypocyclic gear train shown in FIG. 3, the wobble gears 100 and 102 are disposed side-by-side. This construction has a tendency to improve rigidity. For lower gear train ratios, the diameter of wobble gear 100 may differ by as much as 30% or more from the diameter of wobble gear 102. In such a case, wobble gears 100 and 102 may be disposed with one inside the other, so that all gear meshes occur in a single plane.

Not only can the hypocyclic gear train be directly plugged into any of the epicyclic designs, its key design parameters are always visible to the designer, thereby removing the aura of black magic in this area of design. Since the planet gear wobbles, it must be balanced by a counterweight. In many embodiments, the mass of the counterweight required is small relative to the mass of the planet gear itself.

Figure 4:
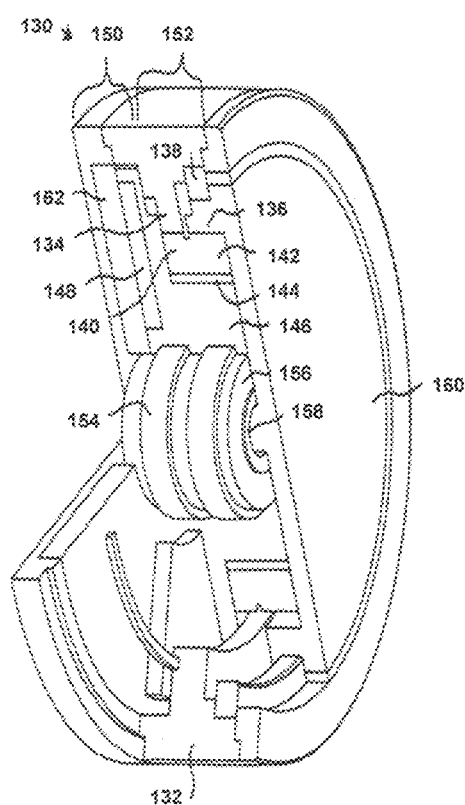
FIG. 4 is a cutaway isometric view of a rotary actuator in accordance with a fourth embodiment of the present disclosure.

FIG. 4, depicts a cutaway isometric view of a rotary actuator 130 in accordance with a fourth embodiment of the present disclosure. The rotary actuator 130 incorporates a central stationary shaft 156 holding support bearings 155 that support the rotating motor armature 148 that drives the eccentric 157. Support bearings 144 on the eccentric 147 drive the wobble cylinder, which contains the planetary gears 140 and 142 that mesh with the bull gear 134 and sun gear 136 separated by the principal cross-roller bearing or similar large diameter bearing 138.

Rotary actuator 130 employs a pancake configuration that incorporates an SRM prime mover 150 to produce a high torque/low speed rotary actuator 130.

Bearing 158 in the output attachment plate 160 supports the end of the stationary shaft 156. Seal 164 separates the output attachment plate 160 from the shell 132 and protects the cross-roller bearing 138 from the elements.

Figure 5:
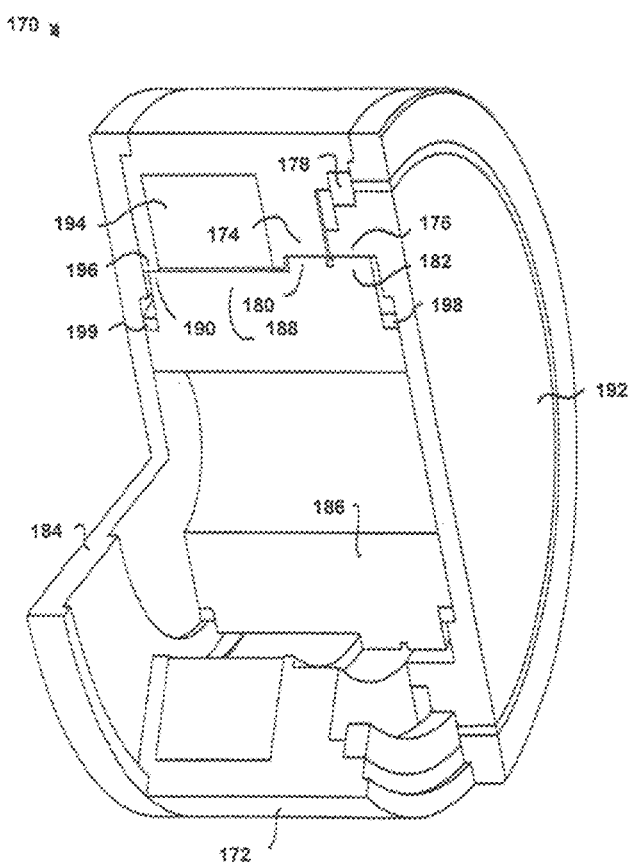
FIG. 5 is a cutaway isometric view of a rotary actuator in accordance with a fifth embodiment of the present disclosure.

FIG. 5 depicts a cutaway isometric view of a rotary actuator 170 in accordance with certain embodiments of the present disclosure. This geometrically different format for a hypocyclic actuator concept is shown in FIG. 5 and generally designated 170. As seen in FIG. 5, the bull gear 174 and stator 194 of actuator 170 are rigidly connected to the outer shell 172 and closed at the end by end plate 184.

Armature 190 contains wobble plate gears 180 and 182, which mesh with bull gear 174 and sun gear 176. Sun gear 176 is separated from bull gear 174 by the principal cross-roller bearing or similar large diameter bearing 178, which also may function as the principal bearing for the joint of the machine into which rotary actuator 170 is incorporated.

Rotary actuator 170 further incorporates bearings 198 and 199 to preload the mesh of the wobble plate gears 180 and 182, so as to ensure that they do not separate and to reduce vibration and the effect of wear.

Bearings 198 and 199 are centered on a second eccentric offset of e, 180.degree. out of phase with the wobble armature eccentric 186. Bearings 198 and 199 roll on cylindrical surfaces machined into the end plate 184 and output plate 192, both of which are concentric with the centerline of the rotary actuator 170.

The high torque, low output velocity rotary actuator 170 shown in FIG. 5 is a combination of a hypocyclic switched reluctance motor, which may generate up to five times higher torque than a standard switched reluctance motor, and a hypocyclic gear train, which may have up to five times higher load capacity than a similar epicyclic gear train. Accordingly, rotary actuator 500 can be said to have, in certain embodiments, an enhanced performance envelope up to 25 times higher than prior designs.

This overall performance enhancement factor of 25 is achieved in rotary actuator 170 with five basic parts, the removal of five additional ancillary bearings and few, if any, components incorporating dimensions having any critical tolerances.

In rotary actuator 170, the wobble motor armature 190 is incorporated into the same part as the wobble plate gear pair 180 and 182. Rotary actuator 170 incorporates a number of distinct advantages over prior designs, including:

The need for only one principal cross-roller bearing 178 and two ancillary bearings 198 and 199;

Simplified controller technology owing to the fact that each stator 194 pole is switched on and off only once in a wave as the wobble motor armature 190 walks through an angle of 360 degrees×e (where e is the eccentricity of the wobble configuration) during each electrical cycle.

The result of the above is a form of magnetic gearing where the electric cycle occurs at an angular velocity rate of 1/e relative to the rotational velocity of the wobble motor armature 190. Given an angular velocity of the electrical field and the wobble speed $w_f = w_e = 6667$ with e=0.015, for example, the output attachment plate 192 would rotate at 100 RPM and the output velocity, $w_o$, would equal 1 RPM given a gear reduction ratio of 100. Because of this electrical wave, torque ripple is virtually non-existent. Also, given a value of e=0.015, a balancing mass at r=30e means that only 1/900, or 0.111%, of the mass of wobble motor armature 190 needs to be removed to perfectly balance wobble motor armature 190. The attributes of actuator 170 are such that certain variations of this design may be employed effectively as a back-drivable generator to produce energy from a mechanical power source, such as a wind turbine.

For at least the embodiments shown in FIGS. 3-5, the following additional specific comments apply. In certain embodiments, the gear teeth are circular arch teeth in order to enhance smoothness, reduce noise from gear tooth impact and reduce the contact Hertzian stress. In other embodiments, triangular gear teeth may better satisfy the application requirements. In other embodiments, specialized gear tooth geometry may be included where unique application requirements must be met.

Wiring may be disposed entirely in the stationary stator as part of the outer shell and bull gear. The force path through the actuator is short. Armatures may be solid or laminated metal. Few, if any, critical dimensions are required, thereby reducing the influence of manufacturing tolerances and temperature variations on performance. The use of short gear teeth reduces bending stresses and friction losses. The meshing of up to thirty teeth picks up and releases the load slowly to reduce noise.

For at least the embodiments shown in FIGS. 3-5, each gear tooth can be profiled to be slightly preloaded as it comes into its central position, in order to reduce the generation of lower-order harmonics and control backlash and lost motion. This preloading can be accomplished through the introduction of a slight interference between that tooth and the mating teeth as that tooth comes into its central position. In certain embodiments, a cavity may be introduced within each wobble gear tooth in order to tailor the stiffness of the teeth and reduce closing noise. As previously mentioned, a portion of the required compliance may derive from a partially compliant bearing between the driving eccentric and the wobble gear.

Figure 6:
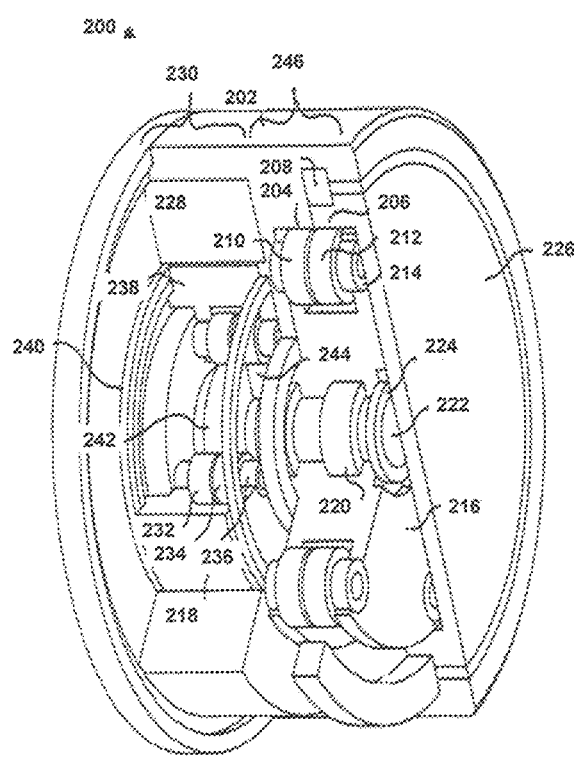
FIG. 6 is a cutaway isometric view of a rotary actuator in accordance with a sixth embodiment of the present disclosure.
Figure 7:
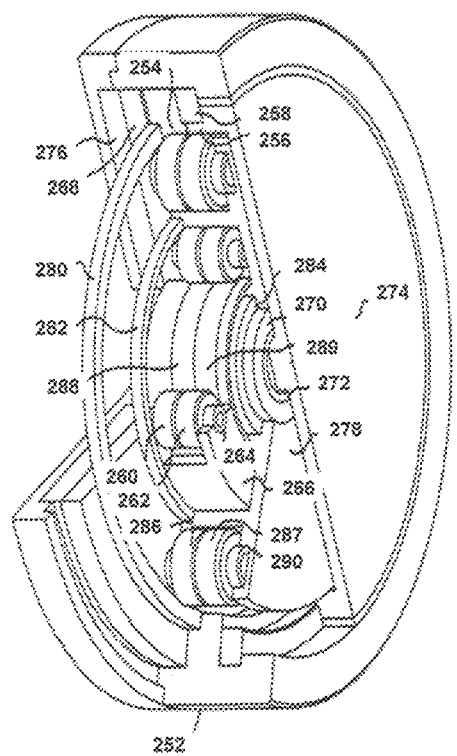
FIG. 7 is a cutaway isometric view of a rotary actuator in accordance with a seventh embodiment of the present disclosure.

Certain applications may require a rugged rotary actuator with a stiff output gear train of high reduction ratio in a compact configuration. Depending on the specifics, such an actuator may be driven either by a cylindrical brushless D.C. Motor (DCM) or a pancake switched reluctance motor (SRM) prime mover. FIGS. 6 and 7, respectively, are cutaway isometric views of these alternate embodiments.

Rotary actuator 200 of FIG. 6 has a "coffee can" profile, while rotary actuator 250 of FIG. 7 has the shape of a circular pancake disk. Rotary actuator 200 is designed for use in robotics, while rotary actuator 200 is useful in confined spaces between two walls. Both rotary actuators 200 and 250 are capable of producing relatively high torque at relatively low speeds. All other things being equal, rotary actuator 200 will generally have a higher maximum speed than rotary actuator 250 and a somewhat lower maximum torque.

FIG. 6 is a cutaway isometric view of a rotary actuator 200 with the first stage of the epicyclic gear train 230 inside the magnet cylinder 218 of the relatively high speed D.C. motor field 228. The planets 232 and 234 ride on bearings 236 in a planet cage 238 attached to the magnet cylinder 218, which, in turn, rides on bearings 660. This embodiment is ideal for use in dexterous machines.

Planets 232 and 234 may form a Ferguson paradox configuration driving moving external sun gear 244 and stationary external bull gear 242 attached to the central shaft 222 of rotary actuator 200. Central shaft 222 is attached to the outer shell 202 using machine bolts (not shown).

In certain embodiments, the first stage may be designed to reduce its inertia, as it experiences higher speeds and lower torque. Planet gears 232 and 234 may be made relatively narrow and still carry the necessary load. The specific design parameters of these planet gears 232 and 234 are dictated by the application.

There will be a trade off between the size of the motor components (the magnet cylinder 218 and the field 228) and the outer diameter of the first stage epicyclic gear train 230. The smaller the internal diameter of magnetic cylinder 218 and field 228, the larger the torque produced. The stationary central shaft 222 is long in this design and subject to flexure. It is, therefore, supported by bearing 230.

Sun gear 244 is rigidly connected to the driving cage 216 of the second stage epicyclic gear train 246 riding on large needle bearings 220 carrying planet gears 210 and 212 riding in bearings 214. These planet gears 210 and 212 mesh with stationary internal bull gear 204, which is attached to the outer shell 202, and internal sun gear 206 is attached directly to the output attachment plate 226.

Seal 248 separates the attachment shell 202 from the plate 226. External sun gear 244 and its planet cage 238 support a bearing 249, which is held in place by the outer shell 202. The shape of outer shell 202 supporting bearing 249 not only strengthens the outer shell 202 but also improves the rigidity of the central stationary shaft 222. Internal sun gear 206 is rigidly attached to the output attachment plate 226, which contains bearing 224, to further strengthen the output structure of rotary actuator 200.

The second stage 246 of the epicyclic gear train uses an internal bull gear 204 and sun gear 206. This arrangement conforms to the basic configuration of the structure, minimizing weight while at the same time making rotary actuator 200 particularly rugged and stiff.

In the second stage 246, the velocities are lower so the concern for inertia goes down accordingly, but the regard for stiffness and load capacity go up. Hence, the size of the gear teeth in the second stage 246 must meet the requirement for load as a first priority, with stiffness as a second priority. This may require, in certain applications, the use of as many planets 210 and 212 as the geometry will allow.

The principal bearing in this configuration is the cross-roller bearing or similar large diameter bearing 208. It separates internal bull gear 204 and shell 202 from internal sun gear 206 and output attachment plate 226. Cross-roller bearing 208 also performs the load bearing tasks for the machine using this actuator. Because of the position of cross-roller bearing 208, internal bull gear 204 can be made very stiff, as can internal sun gear 206. For maximum stiffness and minimum deflection under load, the attachments to the neighboring links should be made close to cross-roller bearing 208.

FIG. 7 depicts, in a cutaway isometric view, an embodiment of a rotary actuator 250 of the present disclosure configured for a relatively low speed pancake SRM, which produces relatively high torque. The bull gear 254 is made especially strong and is rigidly attached to the attachment shell 252 and supporting bearing 732 to the primary stationary shaft 270, so as to further strengthen the output attachment plate 274 for this design.

Magnet disk 268, in concert with field 276, directly drives the first stage planet cage 266 for planet gears 260 and 262, which are supported in bearings 264. The first stage planet cage 268 must be carefully designed to accommodate the planet gears 260 and 262 while maintaining sufficient structural integrity.

The second stage planet cage 277 is driven by, and rigidly attached to, the first stage sun gear 289, which is supported by three bearings 278, 280 and 282 in order to maximize its support. This support is incorporated to resist twisting moments generated by the second stage planets 284 and 286 supported in bearings 287. The first stage sun gear 289 and bull gear 288 are external gears. Bearing 272 supports the first stage planet cage 266 in the first stage sun gear 289, which drives the second stage planet cage 277.

The second stage sun gear 256 and bull gear 254 are internal gears. This arrangement serves to match the structural geometry of the rotary actuator 250 so as to stiffen the structure. The second stage sun gear 256 and bull gear 254 are separated by the principal cross-roller bearing or similar large diameter bearing 258 which acts as the principal bearing in the gear train while also serving as the principal bearing of the joint into which the rotary actuator 250 is incorporated. In order to maximize rigidity, the attachments to the attachment shell 252 and to the output attachment plate 274 should be placed close to cross-roller bearing or similar large diameter bearing 258.

Since the second stage bull gear 254 and sun gear 256 are relatively large in diameter, they are able to accommodate more second stage planets 284 and 286 and larger gear teeth. Accordingly, second stage planet gears 284 and 286 are shown to be relatively large as compared to planet gears 260 and 262 in FIG. 7.

Because of the lower speeds encountered in the second stage gear train, concern for inertia is superseded by a concern for the load capacity of the gear teeth. This is also true, to a lesser extent, in the first stage of the gear train. The outer envelope of the first stage is smaller in diameter than the outer envelope of the second stage, which is appropriate since it carries less load but operates with larger angular velocities.

Figure 8:
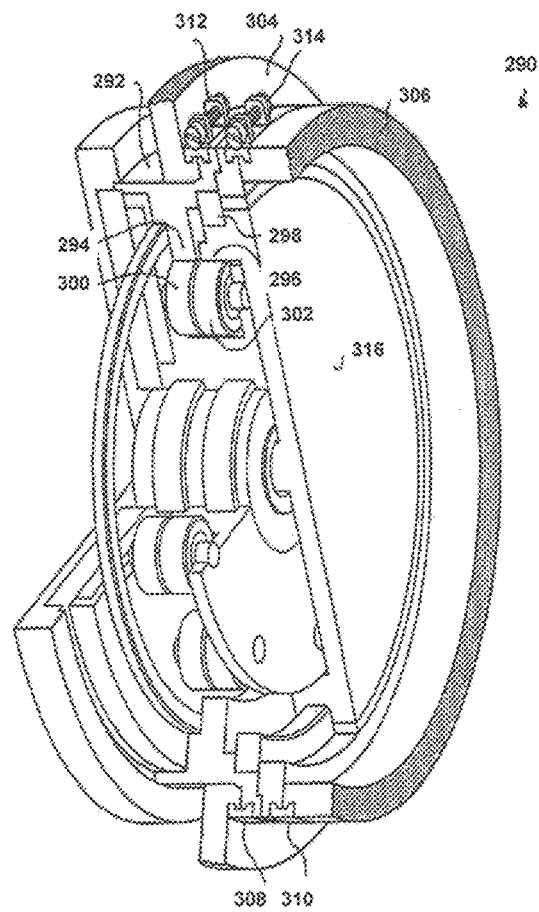
FIG. 8 is a cutaway isometric view of a rotary actuator in accordance with certain embodiments of the present disclosure.

FIG. 8 depicts a cutaway isometric view of a rotary actuator 290 incorporating a quick-change attachment architecture in accordance with certain embodiments of the present disclosure. Rotary actuator 290 incorporates an actuator shell 292 containing a bull gear 294, and sun gear 296, separated by a cross-roller bearing or similar large diameter bearing 298. Planet gears 300 and 302 mesh with bull gear 294 and sun gear 296, respectfully.

As seen in FIG. 8, actuator 290 rigidly connects a first mechanical link 304 to a second mechanical link 322. First mechanical link 304 is rigidly connected to actuator shell 292 by a first wedge clamp 308, while second mechanical link 306 is rigidly connected to output attachment plate 318 by second wedge clamp 310. In one embodiment, each of wedge clamps 308 and 310 takes the form of a pair of semi-circular wedge clamp halves tightened against actuator 290 by an external band clamp. Other equivalent structures may, of course, be employed without departing from the spirit and scope of the present disclosure.

In the embodiment shown in FIG. 8, wedge clamps 308 and 310 are tightened by a pair of tensioning mechanisms 312 and 314. Depending on the particular application, tensioning mechanisms 312 and 314 may be integral to the wedge clamps 308 and 310, or they may be integral to separate band clamps disposed around wedge clamps 308 and 310.

Each of wedge clamps 308 and 310 incorporates a pair of generally-conic internal surfaces, together forming a groove about the internal surface of the wedge clamp 308 and 310. The internal profile of each of these internal surfaces conforms to a mating external surface on either the actuator 290 or one of the mechanical links 304 and 306. As the tensioning mechanisms 312 and 314 are tightened, the normal force between the generally-conic internal surfaces and the mating external surfaces will draw the mating components together into a tight and rigid mechanical connection. In certain embodiments, the design of wedge clamps 308 and 310 will conform to one of a standard set of sizes. Within each standard size, there may be two or more strength classes, similar to the types of classification employed for standardized threaded fasteners.

Mechanical links 304 and 306 are disposed closely adjacent to one another and to principal cross-roller bearing 298. With the attachment of mechanical links 304 and 306 in this manner, closely adjacent to one another and to principal cross-roller bearing 298, it can be seen that the joint rigidly resists motion about five of the six degrees of freedom, with the remaining degree of freedom controlled by the prime mover and gear train combination.

It can be seen that the "force path" through the rotary actuator 290 is extremely short, and passes through a combination of highly rigid mechanical structures and connections and associated rigid structures. This short force path and associated rigid structures enable the rotary actuator 290 to serve as the rotary joint for the machine itself, rather than serving merely as a torque input device, as in prior designs.

It will be appreciated by those of skill in the art that, although the quick-change attachment structures of rotary actuator 290 are shown in connection with a particular embodiment of the present disclosure, the attachment structures shown in FIG. 8 can be employed in connection with any of the embodiments described herein without departing from the spirit and scope of the present disclosure. Where simplicity is desired, simple bolt circles may prove adequate where accuracy and repeatability of the interface are not high priorities, or where a quick change of the actuator out of the system is not considered important to the application.

The structures shown and described in connection with FIG. 8 apply to all rotary actuators described herein. The geometry of a machine built from the actuators described herein will be primarily dependent on the members attached to the actuators rather than on the actuators themselves. Depending on the application, the links may be parallel to one another, perpendicular to one another, or disposed at any general spatial orientation to one another. The link geometry provides a machine designer with a great deal of freedom to design the system without the necessity for customized components. The use of standardized components can, in many instances, reduce cost, owing to the availability of mass production of both the actuators and the links connecting them. At the same time, a high degree of generality and flexibility can be preserved for the designer, even when using standardized components.

Figure 9:
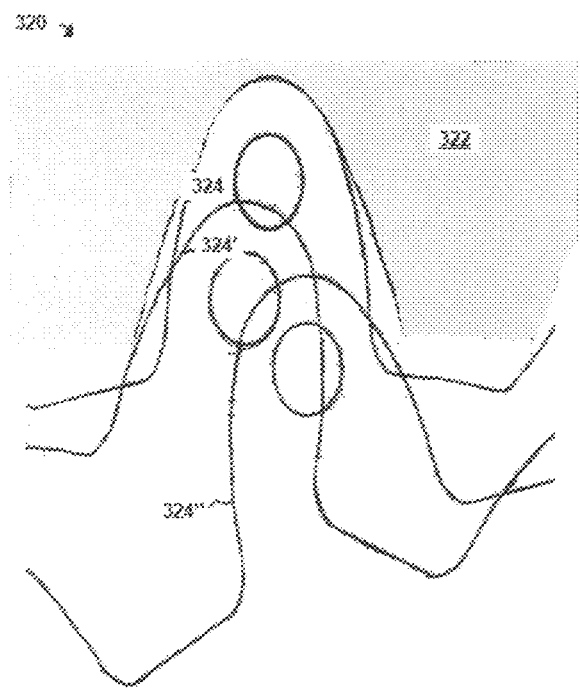
FIG. 9 is a side view of a circular arc gear tooth mesh in accordance with certain embodiments of the present disclosure.

FIG. 9 shows a side view of a circular arc gear tooth mesh in accordance with certain embodiments of the present disclosure. Specifically, it shows the sequence of motion, within a sun/bull gear mechanism 320, of a sun gear tooth as it enters and exits its central position within the body of the stationary bull gear 322.

The initial position of the sun gear tooth at time T0, prior to engagement with the bull gear 322 is designated 324. The central position of the sun gear tooth at time T1, some period of time after time T0, is designated 324'.

In certain embodiments, the geometry of mechanism 320 may be such that a slight interference is encountered as the sun gear tooth moves into the central position 324'. In such embodiments, the gear tooth stiffness and the level of interference in the central position 324' will determine the forces generated by the elastic deformation of the bull gear 322 and the top of the sun gear tooth. This interference will tend to reduce or eliminate any free motion in any of the bearings supporting the sun gear. It can be seen in FIG. 9 that the sun gear tooth 324 shown incorporates a cavity in order to reduce its stiffness, as will be described in more detail below in connection with FIGS. 10-12.

After time T1, at which point maximum interference and deformation, if any, occur, the sun gear tooth 324' will move out of engagement with the bull gear 322. The position of the sun gear tooth at a point in time T2 after time T1 is designated 324''.

Figure 10:
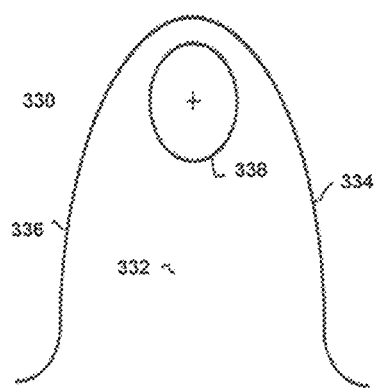
FIG. 10 is a side view of a single circular arc gear tooth in accordance with certain embodiments of the present disclosure.
Figure 11:
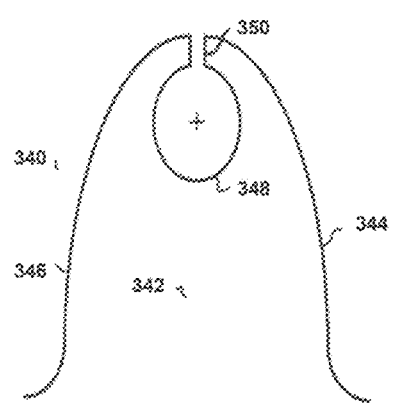
FIG. 11 is a side view of a single circular arc gear tooth in accordance with certain embodiments of the present disclosure.
Figure 12:
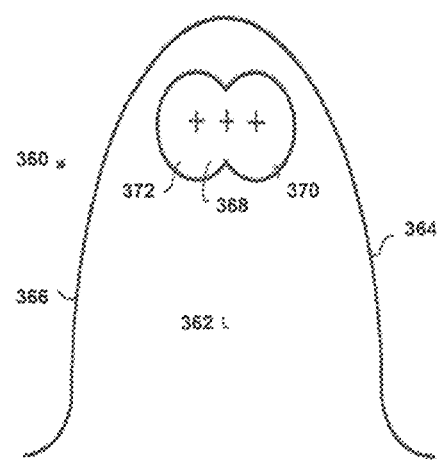
FIG. 12 is a side view of a single circular arc gear tooth in accordance with certain embodiments of the present disclosure.

Examples of gear tooth geometry useful in connection with gear mechanism 320 and similar gear mechanism are shown in FIGS. 10-12.

FIG. 10 depicts a side view of a circular arc gear tooth 330 having a body 332, a first flank 334, a second flank 336, and a circular cavity 338 disposed at the top of the body 332. The position and diameter of cavity 338 will be determined by the requirements of a particular application. In general, the stiffness at the peak of gear tooth 330 will be reduced as the diameter of the cavity 338 is increased or its central axis is moved closer to the peak of gear tooth 330. Reducing the diameter of the cavity 338 or moving it further down into the body 332 will have the opposite effect, tending to stiffen the peak of gear tooth 332.

FIG. 11 depicts a side view of a circular arc gear tooth 340 having a body 342, a first flank 344, a second flank 346, and a circular cavity 348 disposed at the top of the body 342. Gear tooth 350 further incorporates a slot 350 at the top of circular cavity 348, so as to reduce the rigidity of the top of the body 342 of gear tooth 350.

FIG. 12 depicts a side view of a circular arc gear tooth 360 having a body 362, a first flank 364, a second flank 366, and a cavity 368 disposed at the top of the body 362. Cavity 368 is composed of two circular cavities 370 and 372, which overlap in the center of gear tooth 360. This design preserves the local stiffness at the top of the gear tooth 360.

In essence, therefore, the disclosed subject matter provides a self-contained integrated actuator that combines a prime mover and gear train for yielding a compact rotary actuation torque within a larger system. The self-contained integrated actuator includes a cross-roller bearing for operating as a structural joint in the larger system of which the self-contained integrated actuator is a part. An outer attachment shell for rigidly interfacing the larger system and containing a motor stator and an internal bull gear, the motor stator for generating a controllable electromagnetic field, and the internal bull gear for interfacing the cross-roller bearing and providing stiffness for the self-contained integrated actuator, and further comprising a plurality of internal gear teeth. An output attachment plate contains an internal ring gear and supporting a plurality of drive shaft bearings. The internal ring gear rigidly interfaces the output attachment plate and further includes a plurality of internal gear teeth, the cross-roller bearing further for positioning the output attachment plate within the outer attachment shell. A drive shaft holds a prime mover rotor and an eccentric and associating with the output attachment plate via the plurality of drive shaft bearings, the prime mover rotor rotates in response to the controllable electromagnetic field and the eccentric.

A gear train associates with the eccentric and includes the meshing gear, wherein the meshing gear further comprises a plurality of external gear teeth, the external gear teeth includes circular arc surfaces that mesh with the plurality of internal gear teeth of the internal bull gear and the plurality of internal gear teeth of the internal ring gear, the gear train walk a minimal number of the plurality of external gear teeth for each rotation of the prime mover rotor. The cross-roller bearing, the outer attachment shell, the drive shaft, and the meshing gear train cooperate to provide a self-contained integrated actuation torque transmitting force from the prime mover through the gear train along a shortest-possible transmission path.

The cross-roller bearing, the outer attachment shell, the drive shaft, the meshing gear train, and the prime mover associate in the form of a pancake-shaped self-contained integrated actuator having a diameter at least equal to approximately the length of the cylindrical self-contained integrated actuator. The self-contained integrated actuator may, for example, either associate the cross-roller bearing, the outer attachment shell, the drive shaft, the meshing gear train, and the prime mover associate in the form of a cylindrical self-contained integrated actuator having a height at least equal to approximately the diameter of the cylindrical self-contained integrated actuator.

The self-contained integrated actuator may be configured so that the internal bull gear, the internal ring gear, and the meshing gear or wobble gear form a hypocyclic gear train or include a planet gear for forming an epicyclic gear train. Alternative, the meshing gear may be a fixed axis gear for forming a star-compound gear train.

The self-contained integrated actuator may be formed to be of a size specified by a predetermined set of standardized dimensions. The standardized dimensions may accord with predetermined certification requirements for use of the self-contained integrated actuator. Also, the predetermined certification requirements may define a minimal number of standardized dimensions for a maximal variety of uses of the self-contained integrated actuator. The internal gear teeth of the internal bull gear, the internal gear teeth of the internal ring gear, and the external gear teeth of the meshing gear may associate with at least a 75-to-1 gear reduction ration.

The self-contained integrated actuator may further include a quick-change interface for rapid replacement of the self-contained integrated actuator. The quick-change interface accommodates rapid replacement of the self-contained integrated actuator, wherein the quick-change interface has the form of a predetermined subset of a plurality of predetermined quick-change interface forms. In addition, the quick-change interface may provide a resistive force in up to six directions, at least a subset of the up to six directions demonstrating a predetermined degree of structural stiffness. As such, the quick-change interface is positioned immediately proximate to the cross-roller bearing for providing a minimal force path from the prime mover through the gear train to the quick-change interface.

The prime mover may operate at a maximal power density frequency ranging up to approximately 30,000 revolutions per minute. The gear train may operate at reduction rates ranging between approximately 75-to-1 and 5,000-to-1 and further include a hypocyclic gear train for operating at reduction rates ranging between approximately 75-to-1 and 5,000-to-1. Alternatively, the gear train may further include a star-compound gear train for operating at reduction rates ranging between approximately 5-to-1 and 25-to-1. The gear train may further include an epicyclic gear train for operating at reduction rates ranging between approximately 5-to-1 and 75-to-1.

The output attachment plate provides an output torque for maximal torque density ranging from approximately 400 to 600 inch-pounds per pound. The gear train further includes a two-stage configuration, the two-stage configuration further includes a star compound gear train and an epicyclic gear train configuration. Alternatively, the gear train further may include a two-stage configuration, the two-stage configuration further includes an epicyclic gear train and an epicyclic gear train. The internal gear teeth of the internal bull gear, the internal gear teeth of the internal ring gear, and the external gear teeth of the meshing gear mesh with a pressure angle of less than approximately nine degrees.

In its simplest form, the self-contained integrated actuator consists essentially of the cross-roller bearing, the outer attachment shell, the drive shaft, the single-stage meshing gear, and the prime mover for tolerance insensitivity, temperature insensitivity, and increased endurance.

A preloading force applied to the internal bull gear, the internal ring gear, and the wobble gear substantially eliminate backlash in the operation of the self-contained integrated actuator. The preloading force may be derived from interfacing the external gear teeth, the plurality of internal gear teeth of the internal bull gear and the plurality of internal gear teeth of the internal ring gear in a cusp motion perpendicular to the meshing gear. In addition, the disclosed subject matter provides for load sharing among a plurality of the internal teeth of the internal bull gear, a plurality of the internal teeth of the internal ring gear, and a plurality of the external teeth of the meshing gear, thereby substantially eliminating lost motion in the operation of the self-contained integrated actuator.

Concave-convex tooth contact among a internal teeth of the internal bull gear, internal teeth of the internal ring gear, and external teeth of the meshing gear for substantially eliminate lost motion in the operation of the self-contained integrated actuator. In particular, the internal teeth of the internal bull gear, the internal teeth of the internal ring gear, and the external teeth of the meshing gear form a force distribution characteristic in the form of a symmetric parabola.

A plurality of wedge clamps on predetermined sides of the self-contained integrated actuator attach neighboring links to the self-contained integrated actuator. Each of the wedge clamps includes two semi-circular portions for resisting primary opening forces applying to each of the wedge clamps. A band clamp secures each of the wedge clamps into a predetermined position. A plurality of attachments are immediately proximate to the cross-roller bearing.

The self-contained integrated actuator further includes a plurality of operational sensors for sensing operational characteristics of elements from the group consisting essentially of the cross-roller bearing, the outer attachment shell, the drive shaft, the meshing gear train, and the prime mover. The operational sensors may sense operational characteristics of elements from the group consisting essentially of the cross-roller bearing, the outer attachment shell, the drive shaft, the meshing gear train, and the prime mover for maintaining an optimal operational envelope for the self-contained integrated actuator, as well as for maintaining an optimal operational maintenance schedule for the self-contained integrated actuator.

In the embodiments described above, the tooth ends may need more ductility than the remainder of the tooth surface, which should generally be hardened. In certain embodiments, the cavity or cavities may be drilled and/or slotted before hardening. The tooth surface may then be hardened. The tooth tips may be annealed locally to improve the fatigue resistance at the deforming part of the tooth. This annealing may, in certain embodiments, be performed by a laser.

Figure 13:
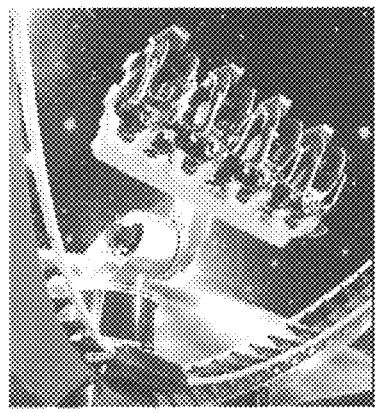
FIGS. 13 through 18 present a variety of exemplary systems in which the disclosed subject matter may find beneficial application.
Figure 14:
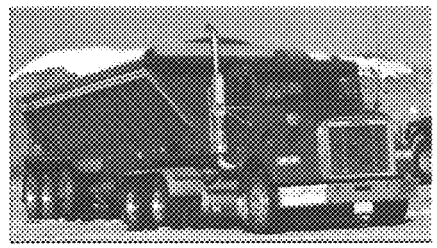
Figure 15:
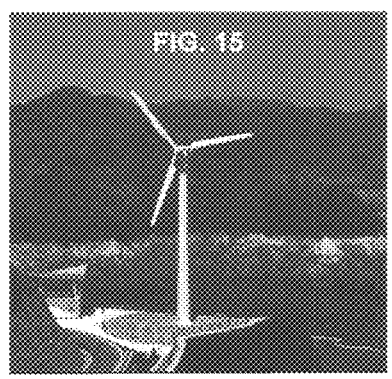
Figure 16:
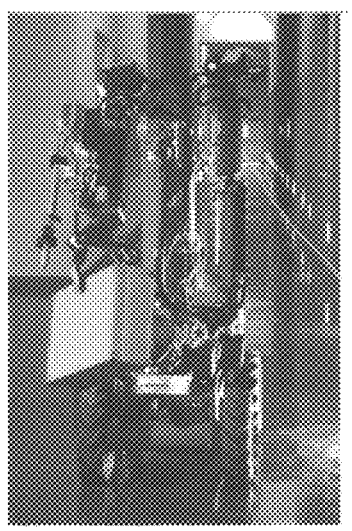
Figure 17:
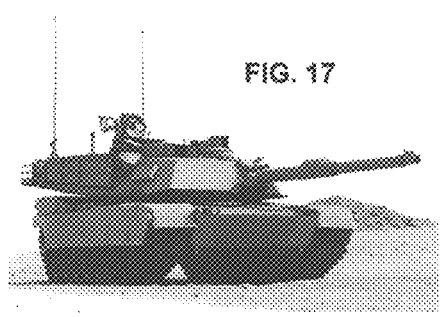
Figure 18:

To be certain, the present disclosure provides an integrated standardized rotary actuator incorporating a prime mover, a gear train, and a rotary machine joint in a single package. These elements are integrated into a single self-contained module that is easily scalable to meet a wide variety of application demands. The rotary actuator may incorporate as few as five principal parts fitted with a minimum of critical tolerances, resulting in a system that is substantially insensitive to tolerance and temperature variations. Applications for the various embodiments here described include a driving force for essentially any machine or apparatus that moves. Transporters in factories, food machinery, and packaging, conveyor, and handling system make ideal applications for the disclosed subject matter. Emerging applications may include space-based, remotely controlled systems (FIG. 13) entertainment systems, educational robots, surgical systems, glove box systems, farm machinery, construction machinery, buses (hybrids), trucks (hybrids) (FIG. 14), elevators, and wind turbines (FIG. 15). Military applications include ships and submarines, aircraft and UAVs, anti-terrorism robots (FIG. 16), AND tanks (including 20 ton vehicles) (FIG. 17). Industrial applications may also include manufacturing cell and robotics applications (FIG. 18). Still further applications may include automobiles and humanoid or prosthesis applications. All such applications as these may provide a significantly improved overall system capable of making novel and beneficial use of the presently disclosed self-contained, integrated gear train and prime mover actuation module.

Figure 19:
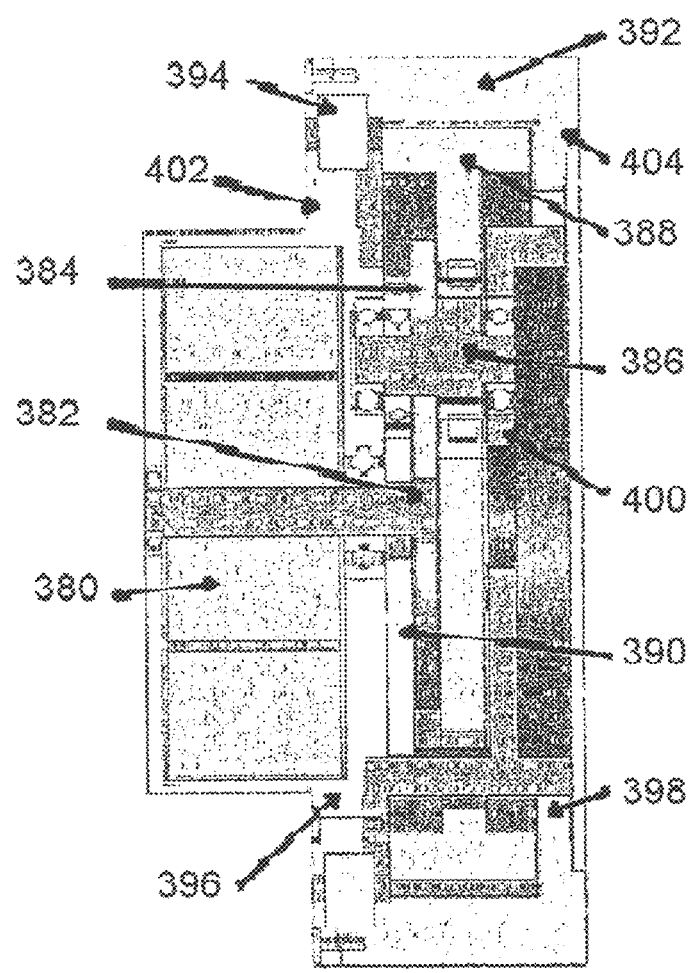
FIG. 19 is a cross-section view of a parallel eccentric electro-mechanical actuator in accordance with one embodiment of the present disclosure.
Figure 20:
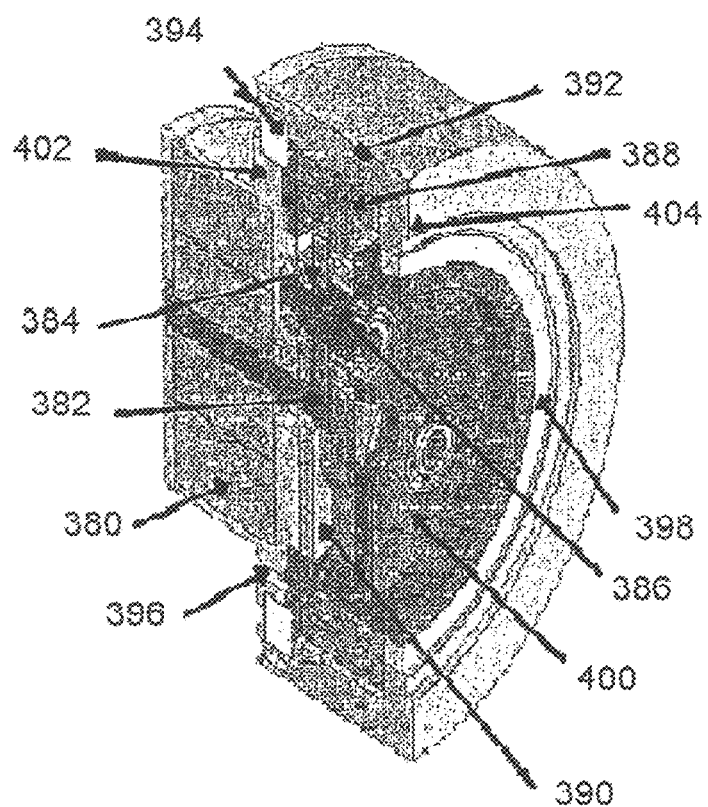
FIG. 20 is a cutaway isometric view of a parallel eccentric electro-mechanical actuator in accordance with one embodiment of the present disclosure.

The electric prime mover 380 drives the pinion gear 382 of the reducer (see FIGS. 19 and 20). The pinion gear 382 drives three (or more) star gears 384 with stationary shaft bearings. Each shaft contains eccentric 386 (all the same size) with value e, which are completely in parallel with each other (in phase). Eccentrics 386 can be thought of as three parallel/in-phase driven crankshafts. Each eccentric drives the parallel eccentric gear 388 (wobble gear, or similar functioning component) through a bearing. The parallel eccentric gear 388 exhibits a circular motion (without rotation) which in itself is unbalanced. To counteract this imbalance, the eccentrics 386 have another eccentric with magnitude k×e which drives a PE balance mass 390. The parallel eccentric mass 390 must create an opposite inertia force to balance that of the parallel eccentric gear 388 (which includes the other unbalanced masses associated with the eccentrics and crankshaft bearings). Hence, the weight of the parallel eccentric mass 390 can be reduced according to the magnitude of the eccentric ratio k.

The parallel eccentric gear 388 contains an external toothed gear on its periphery. It meshes with the internal teeth of the output ring gear 392. The relative motion between the parallel eccentric gear 388 and the output ring gear 392 is that the parallel eccentric gear 388 rolls inside the output ring gear 392. This relative motion is called hypo-cycloidal motion.

A relatively small pinion can drive the concentric star gears such that their ratio can be 1-to-1 up to 4-to-1 in size. Given a ratio of 1-to-1 requires that the pinion increase in diameter such that diametric circle of the eccentric cranks be as large as possible. In this design, most of the compliance at the output will be due to the radial stiffness of the eccentric crank shaft bearings. Hence, larger bearings and larger pinion diameter become necessary to increase the parallel eccentric gear train's (PEGT) output stiffness. Given a 1-to-1 star ratio, the total ratio of the train is that of the mesh of the parallel eccentric gear with the ring gear. Given 52 teeth in the output ring gear and 49 teeth in the parallel eccentric gear should give a ratio of 17.33-to-1 (i.e., the number of teeth divided by the tooth difference). It is entirely possible for this to be 52-to-1 if there is only one tooth difference. Or if the star compound ratio goes to 4-to-1, then 4×17.33=69.3-to-1 becomes the total reduction ratio. Hence, this parallel eccentric gear train provides a new level of freedom for the designer to optimize the gear train in the reduction range from 25-to-1 up to say 200-to-1. Larger values for the star compound ratio reduce the effective mass of the parallel eccentric gear train. Smaller tooth differences between the parallel eccentric gear and the output ring gear (enables smaller eccentrics) allows the use of more and shorter teeth enhancing load capacity and creating greater smoothness in the mesh upload/download cycle.

The parallel eccentric gear trains employ a recommended principal bearings (a cross-roller bearing) 394 between the shell backbone structure 396 and the output ring gear 392. Secondary support bearing 398 is positioned between the output ring gear 392 and the gear cages 400. The principal bearing 394 and support bearing 398 may be similar (in size) tapered roller or 4-point ball bearings in order to reduce cost.

Figure 21:
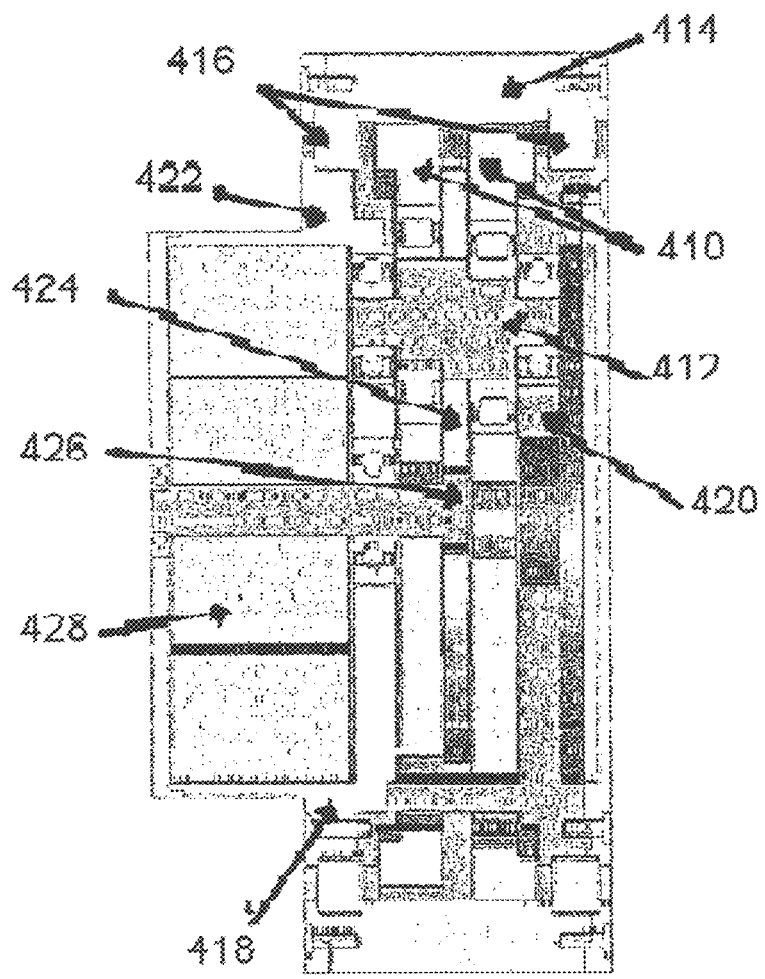
FIG. 21 is a cross-section view of a parallel eccentric electro-mechanical actuator in accordance with a second embodiment of the present disclosure.
Figure 22:
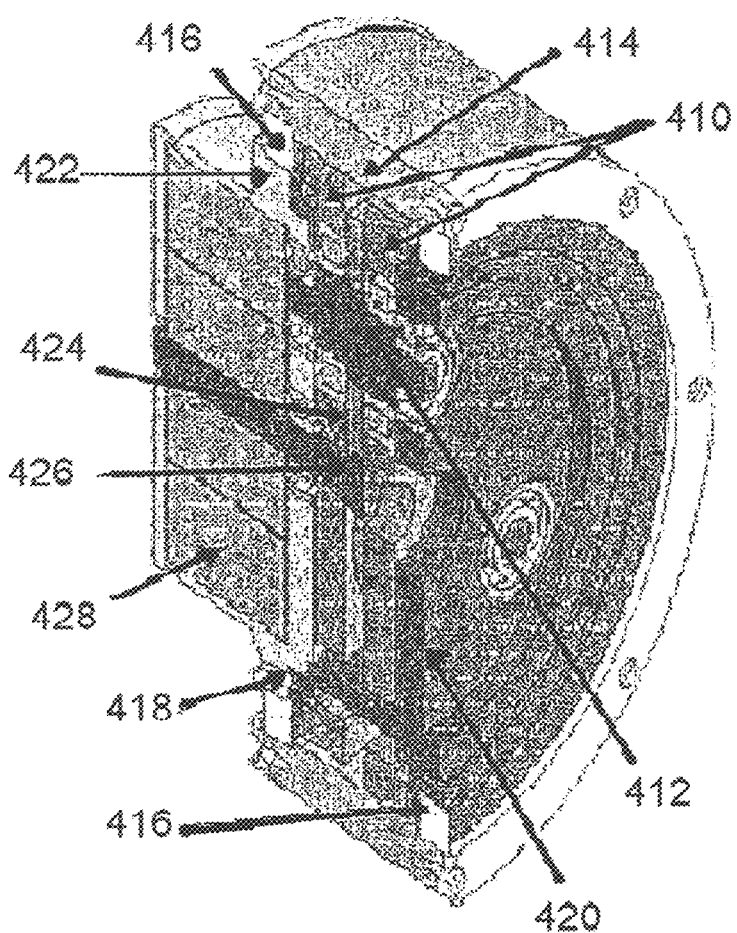
FIG. 22 is a cutaway isometric view of a parallel eccentric electro-mechanical actuator in accordance with a second embodiment of the present disclosure.

A second version of the parallel eccentric gear train is shown in FIGS. 21 and 22. Here, the wobble gear 410 in FIG. 19 is split into two gears (both mesh with the same output ring gear) which are driven by crankshaft eccentrics 412 180° out of phase, which automatically balances the masses. It has the same load capacity in the tooth mesh (the same tooth width) and the tooth load is divided in two locations on the output ring gear 414. It is likely that the crankshaft bearings will individually be 50% of the width of that in FIGS. 19 and 20 (to provide for the same overall size and weight), such that the load capacity will be similar to that for the parallel eccentric gear train in FIGS. 19 and 20. Its stiffness, however, will go up by approximately 50%.

The parallel eccentric gear trains employ a recommended principal bearings (a cross-roller bearing) 416 between the shell backbone structure 418 and the output ring gear 414. A secondary support bearing is positioned between the output ring gear 414 and the gear cages 420. The principal bearing 416 and support bearing may be similar (in size) tapered roller or 4-point ball bearings in order to reduce cost.

Figure 23:
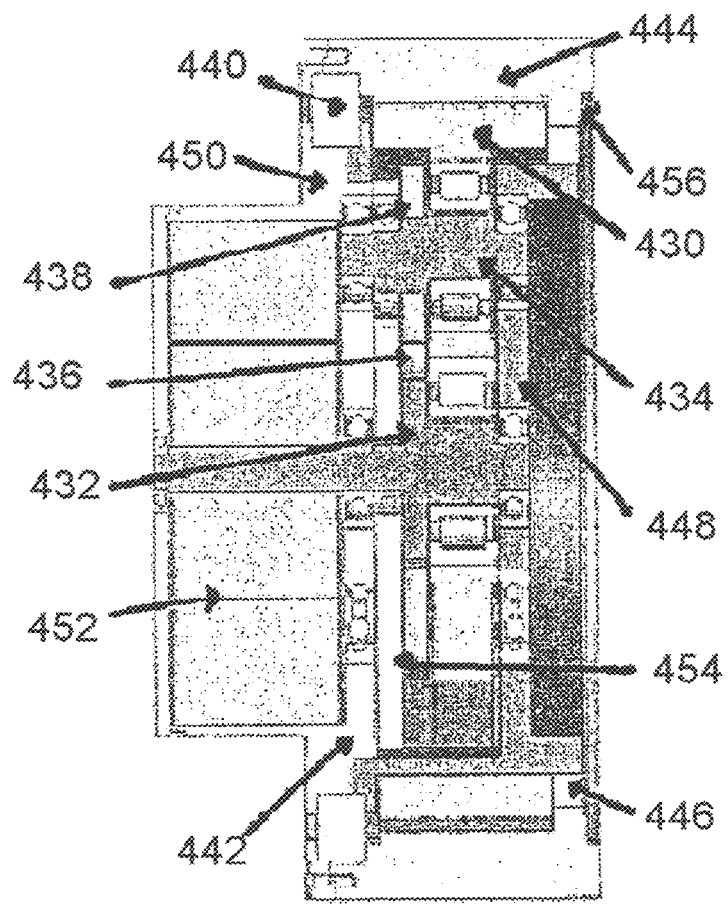
FIG. 23 is a cross-section view of a parallel eccentric electro-mechanical actuator in accordance with a third embodiment of the present disclosure.
Figure 24:
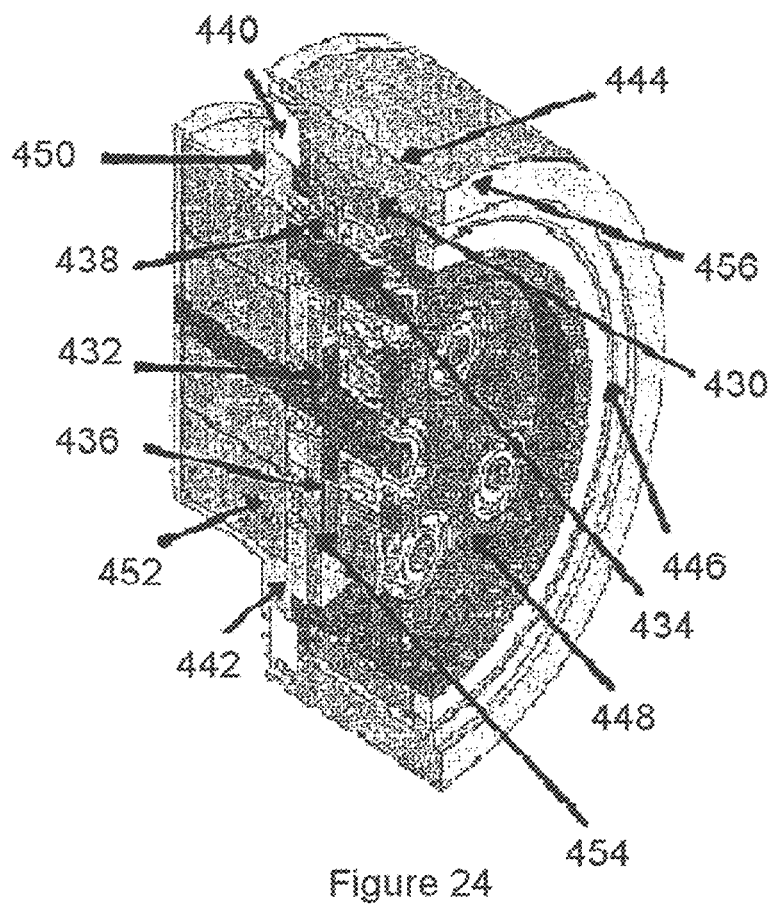
FIG. 24 is a cutaway isometric view of a parallel eccentric electro-mechanical actuator in accordance with a third embodiment of the present disclosure.

A third version of this parallel eccentric gear train is laid out in FIGS. 23 and 24. In this case, a single parallel eccentric gear 430 is combined with a central (extra) crankshaft along the gear train's center line. This requires that the central eccentric, input pinion 432, and the three concentric eccentrics (crankshafts) 434 all rotate in unison (parallel) and in the same direction. This necessitates the use of idler gears 436 between the input pinion 432 and the star gears 438 on the concentric eccentrics (crankshaft) 434. This is called the PEx gear arrangement (x for extra crankshaft), and will refer to the gear train as PExGT. The central crankshaft, input pinion 432, ensures an equal load distribution among the concentric eccentrics (crankshafts) 434. Relative to the parallel eccentric gear train in FIG. 19, this PEx design should be approximately 2.4× stiffer and provide for 3× larger load carrying capacity. (Note that these results depend on the same criteria for the crankshaft bearing selection in both designs).

The parallel eccentric gear trains employ a recommended principal bearings (a cross-roller bearing) 440 between the shell backbone structure 442 and the output ring gear 444. Secondary support bearing 446 is positioned between the output ring gear 444 and the gear cages 448. The principal bearing 440 and support bearing 446 may be similar (in size) tapered roller or 4-point ball bearings in order to reduce cost.

Figure 25:
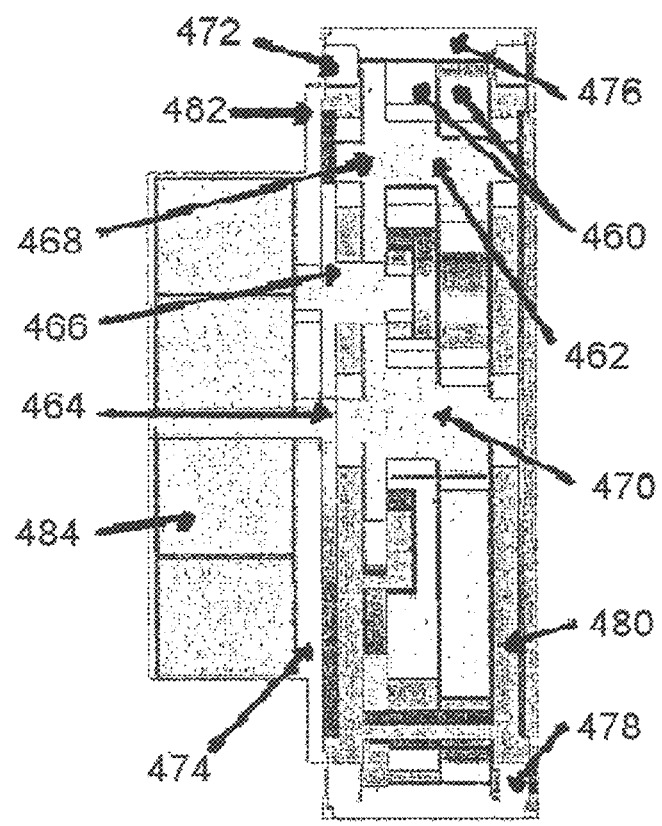
FIG. 25 is a cross-section view of a parallel eccentric electro-mechanical actuator in accordance with a fourth embodiment of the present disclosure.
Figure 26:
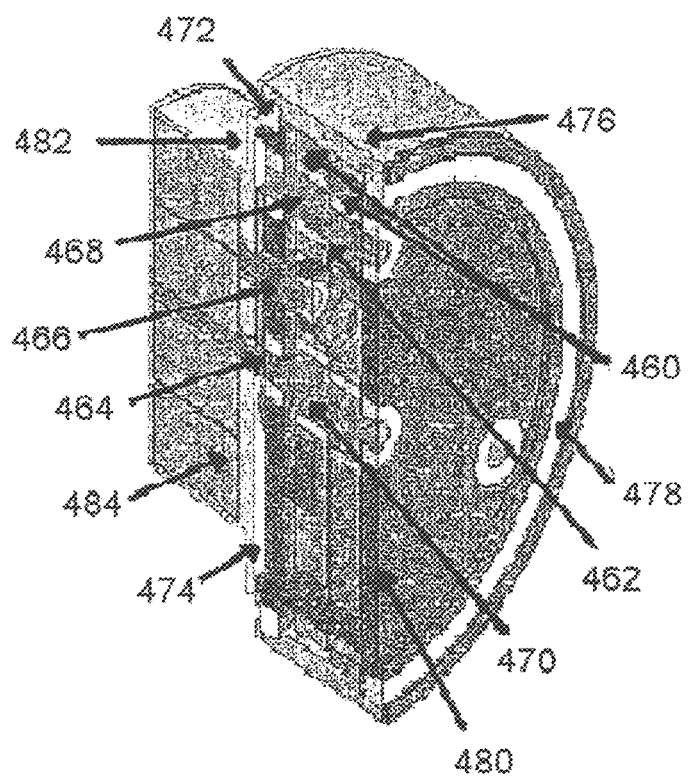
FIG. 26 is a cutaway isometric view of a parallel eccentric electro-mechanical actuator in accordance with a fourth embodiment of the present disclosure.

A fourth vision of the parallel eccentric gear train is provided in FIGS. 25 and 26. The principal issue being addressed is the need to not only have the strengthening central shaft but also a pair of (dual) eccentric gears 460 operating 180° out of phase to better carry the external load at the three concentric eccentrics (crankshafts) 462. In the parallel eccentric design, the critical load elements are the bearings on the three concentric crankshafts. This dual eccentric configuration essentially doubles their number in a very compact arrangement. The input pinion 464 drives three concentric amplifier gears 466 in a star compound arrangement which replace the role of the idler gears in the PExGT of FIGS. 23 and 24. The amplifier gears 466 then drive star gears 468 attached to each of the three concentric eccentrics (crankshafts) 462 to make a very compact input structure for the dual eccentric gears 460 with the "extra" central crankshaft 470. The extra crankshaft 470 enables the external load on the gear train to be evenly distributed among the three concentric eccentrics (crankshafts) 462. The goal is to lighten all gears by using thin web structures between their support bearings and their external teeth. Also, the maximum size bearing is intended for all crankshaft bearings.

The parallel eccentric gear trains employ a recommended principal bearings (a cross-roller bearing) 472 between the shell backbone structure 474 and the output ring gear 476. Secondary support bearing 478 is positioned between the output ring gear 476 and the gear cages 480. The principal bearing 472 and support bearing 478 may be similar (in size) tapered roller or 4-point ball bearings in order to reduce cost.

Figure 27:
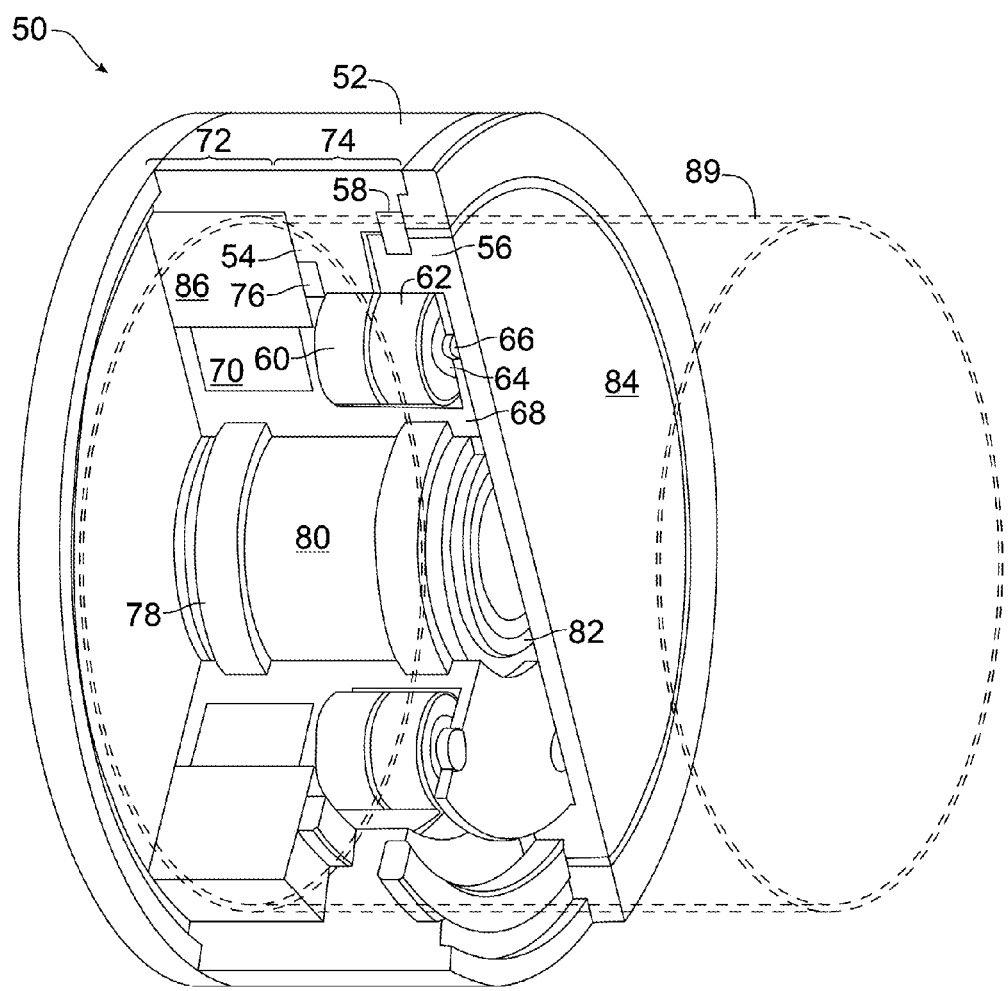
FIG. 27 is a cutaway isometric view of the rotary actuator of FIG. 2 which has been annotated to depict the annular shortest force path that exists in this actuator.

As noted above, rotary actuators may be made in accordance with the teachings herein whose construction is based on shortest force path principles. Such a construction is depicted in FIG. 27, which illustrates the envelop 89 through which the shortest force path for the rotary actuator 50 of FIG. 2 passes. As seen therein, the principal bearing 58 (which is preferably a cross-roller bearing) has a first surface which is attached to the output attachment plate 84, and a second surface which is attached to the outer attachment shell 52. Hence, force passes from the outer attachment shell 52 through the principal bearing 58 and through the output attachment plate 84.

In a preferred embodiment of a rotary actuator made in accordance with the foregoing principles, the output attachment plate 84, outer attachment shell 52 and principal bearing 58 are arranged such that the shortest force path passes through the output attachment plate 84, the principal bearing 58 and the outer attachment shell 52 (preferably in that order in going from the output attachment plate 84 to the outer attachment shell 52) along an axis perpendicular to the output attachment plate 84. The envelop 89 through which the shortest force path for the rotary actuator 50 of FIG. 2 passes preferably includes a line, more preferably a cylinder (which is preferably a right cyclinder whose axis is perpendicular to said output attachment plate 84), and most preferably an annulus. Such an arrangement ensures that the shortest force path through these elements and/or through the rotary actuator 50 is attained. The advantage of a shortest force path which includes an annular envelop may be appreciated by considering a single tooth gear mesh for external rotating gears and the locking effect of the two face gears (as in synchro mesh gear clutches), where all teeth share equally in the load (the ideal condition).

An arrangement of this type also enhances or optimizes stiffness in the actuator. For example, a bending component in an actuator typically reduces stiffness by three orders of magnitude (400×), while any torsional component is typically 2500× less stiff than an equivalent linear path.

The use of a cross-roller bearing in such a configuration also enhances stiffness, since the roller bearing will always be the weakest component in the linear force path. In this respect, it is to be noted that single point race contact ball elements are the least stiff, while double point race contact ball elements are roughly 50% more stiff than a corresponding single point race contact ball element. However, a cross-roller bearing has a linear contact with the race which is roughly 6× stiffer than a 2-point race contact ball element, and 9× as stiff as a single-point race contact ball element. In this respect, it is to be noted that radial and bending loads effectively load only a small portion of the rolling elements, with a gradual drop-off of contact force from the principle contact force or center. Hence, an important (and frequently dominant) objective is to utilize the stiffest bearing so as to make maximum linear contacts, thus maximizing durability and preventing non-compatible tolerances or deformations among multiple bearings that are doing the same task. It is found that actuator durability is largely determined by the wear history of the bearings, since the gear mesh is increasingly better able to carry out its function by continuously improving designs.

Various embodiments of actuators made in accordance with the foregoing principles may be constructed in which the shortest force path configuration may be expressed in various ways which may vary from one embodiment or application to another. For example, if the envelop 89 through which the shortest force path for the rotary actuator 50 of FIG. 2 passes is a cyclinder, then in some embodiments, it is preferred that the locus formed by the intersection of the cylinder and a first major surface (which may be the exterior surface) of the output attachment plate 84 is a circle.

Symmetry, especially axial or rotational symmetry, is a desirable feature in the actuators described herein. Hence, in a preferred embodiment of an actuator made in accordance with the teachings herein, the output attachment plate rotates about a central axis, and the line, cylinder or annulus containing the shortest force path is preferably parallel to this axis of rotation. Even more preferably, the rotary actuator, the output attachment plate, the principal bearing, and/or the output attachment shell, are axially or rotationally symmetric about the axis of rotation (which is preferably the central axis of the actuator). Symmetry is desirable in these actuators, because deviations from symmetry may distort the symmetric rolling element force distribution, thus causing some elements to carry a correspondingly higher load (thus adversely affecting durability and stiffness and thereby reducing overall load carrying capacity per unit weight).

It will be appreciated that, in the various embodiments of rotary actuators described herein, various considerations or factors may need to be weighed against each other in designing a rotary actuator for a given application. Hence, the desire to minimize weight, volume, cost or the effects of tolerance errors, and/or the desire to maximize stiffness, make the best use of compatible materials, match coefficients of thermal expansion, or to force fit assemblies, may need to be balanced against each other to arrive at a suitable actuator solution. In many applications, cost may be the overriding factor. Hence, for low cost actuator solutions, lower constraints on the design objectives may occur, while on higher end solutions, tighter constraints or better design criteria may be employed.

As previously noted, the rotary actuators disclosed herein may be utilized as structural joints for the devices they are incorporated into. In particular, the rotary actuators disclosed herein preferably combine the traditional functionality of rotary actuators as torque generating devices with the ability of the actuator to act as a structural joint. These aspects may be incorporated into plug-and-play open architecture systems to provide a much more self-contained minimum set of actuators for a maximum range of solutions in the open architecture for a given domain (e.g., motorized vehicle applications). This approach may be effectively utilized to substantially reduce weight, volume and cost in the resulting solution set.

Although preferred embodiments of the disclosure have been described in detail, it will be understood by those skilled in the art that various modifications can be made therein without departing from the spirit and scope of the disclosure as set forth in the appended claims.

What is claimed is:

1. A rotary actuator, comprising:
an output attachment plate which rotates about a central axis;
an outer attachment shell; and
a principal bearing having a first surface which is attached to said output attachment plate, and a second surface which is attached to said outer attachment shell; wherein said output attachment plate has a first major surface, wherein said output attachment plate, said outer attachment shell and said principal bearing are arranged such that a first line exists which is perpendicular to said first major surface of said output attachment plate and which passes through said output attachment plate, said principal bearing and said outer attachment shell, and wherein said first line is parallel to said central axis.

2. The rotary actuator of claim 1, wherein said first line passes through said output attachment plate, said principal bearing and said outer attachment shell, in that order.

3. The rotary actuator of claim 1, wherein said principal bearing is a crossed roller bearing.

4. The rotary actuator of claim 1, wherein said output plate is axially symmetric about said central axis.

5. The rotary actuator of claim 4, wherein said outer attachment shell is axially symmetric about said central axis.

6. The rotary actuator of claim 5, wherein said principal bearing has rotational symmetry about said central axis.

7. The rotary actuator of claim 1, wherein said output attachment plate, said outer attachment shell and said principal bearing are arranged such that a first cylinder exists which passes through said output attachment plate, said principal bearing and said outer attachment shell.

8. The rotary actuator of claim 7, wherein said first cylinder is a right cylinder.

9. The rotary actuator of claim 8, wherein said first cylinder has an axis which is perpendicular to said output attachment plate.

10. The rotary actuator of claim 9, wherein said output attachment plate has a first major surface, and wherein a locus formed by an intersection of said first cylinder and said first major surface of said output attachment plate is a first circle.

11. The rotary actuator of claim 10, wherein said first major surface is a second circle, and wherein said first and second circles are concentric.

12. The rotary actuator of claim 11, wherein said first major surface is an exterior surface.

13. The rotary actuator of claim 10, wherein said output plate rotates about a central axis, and wherein said output plate is axially symmetric about said central axis.

14. The rotary actuator of claim 13, wherein said outer attachment shell is axially symmetric about said central axis.

15. The rotary actuator of claim 14, wherein said principal bearing has rotational symmetry about said central axis.

16. The rotary actuator of claim 1, wherein said output attachment plate contains a first annulus, wherein said outer attachment shell contains a second annulus, and wherein said principal bearing contains a third annulus, and wherein said output attachment plate, said outer attachment shell and said principal bearing are arranged such that said first, second and third annuli are concentric.

17. The rotary actuator of claim 16, wherein a cylinder exists whose surface intersects and is concentric with said first, second and third annuli.

18. The rotary actuator of claim 17, wherein said cylinder is a right cylinder.

19. The rotary actuator of claim 16, wherein said output plate rotates about a central axis, and wherein said output plate is axially symmetric about said central axis.

20. The rotary actuator of claim 19, wherein said outer attachment shell is axially symmetric about said central axis.

21. The rotary actuator of claim 20, wherein said principal bearing has rotational symmetry about said central axis.

22. The rotary actuator of claim 1, wherein said output attachment plate, said outer attachment shell and said principal bearing are arranged such that a force applied in a first direction normal to said output attachment plate is transmitted through said principal bearing and said outer attachment shell with essentially no transmission of force in a direction orthogonal to said first direction.

23. The rotary actuator of claim 1, wherein said outer attachment plate and said outer attachment shell are rigid in a direction orthogonal to a major surface of said outer attachment plate.

24. The rotary actuator of claim 1, wherein said outer attachment plate and said outer attachment shell are rigid in a direction orthogonal to a major external surface of said outer attachment plate.

25. A machine joint which includes the rotary actuator of claim 1.

26. A rotary actuator, comprising:
an output attachment plate;
an outer attachment shell; and
a principal bearing having a first surface which is attached to said output attachment plate, and a second surface which is attached to said outer attachment shell;
wherein said output attachment plate, said outer attachment shell and said principal bearing are arranged such that a force applied in a first direction normal to said output attachment plate is transmitted through said principal bearing and said outer attachment shell with essentially no transmission of force in a direction orthogonal to said first direction.

27. A rotary actuator, comprising:
an output attachment plate;
an outer attachment shell; and
a principal bearing having a first surface which is attached to said output attachment plate, and a second surface which is attached to said outer attachment shell;
wherein said outer attachment plate and said outer attachment shell are rigid in a direction orthogonal to a major surface of said outer attachment plate.

* * * * *